United States Patent [19]
Herbert, III

[11] Patent Number: 6,018,742
[45] Date of Patent: Jan. 25, 2000

[54] CONSTRUCTING A BIFURCATED DATABASE OF CONTEXT-DEPENDENT AND CONTEXT-INDEPENDENT DATA ITEMS

[75] Inventor: Charles St. John Herbert, III, Los Altos, Calif.

[73] Assignee: Perigis Corporation, Los Altos, Calif.

[21] Appl. No.: 09/111,387

[22] Filed: Jul. 7, 1998

[51] Int. Cl.[7] .................................................. G06F 17/30
[52] U.S. Cl. ............................... 707/102; 707/10; 707/4; 704/8; 709/303
[58] Field of Search ................... 707/4, 10, 102; 704/8; 709/303; 345/333

[56] References Cited

U.S. PATENT DOCUMENTS

| | | | |
|---|---|---|---|
| 4,595,980 | 6/1986 | Innes | 364/200 |
| 4,615,002 | 9/1986 | Innes | 364/200 |
| 4,627,019 | 12/1986 | Ng | 364/900 |
| 4,742,467 | 5/1988 | Messerich et al. | 364/200 |
| 4,774,661 | 9/1988 | Kumpati | 364/300 |
| 4,791,561 | 12/1988 | Huber | 364/300 |
| 4,805,099 | 2/1989 | Huber | 364/300 |
| 4,819,160 | 4/1989 | Tanaka et al. | 364/300 |
| 4,833,597 | 5/1989 | Wakayama et al. | 364/200 |
| 4,979,109 | 12/1990 | Tanaka et al. | 364/200 |
| 5,148,541 | 9/1992 | Lee et al. | 395/600 |
| 5,157,606 | 10/1992 | Nagashima | 364/419 |
| 5,185,887 | 2/1993 | Takahashi et al. | 395/600 |
| 5,307,265 | 4/1994 | Winans | 704/8 |
| 5,386,556 | 1/1995 | Hedlin et al. | 704/4 |
| 5,416,903 | 5/1995 | Malcolm | 345/333 |
| 5,442,782 | 8/1995 | Malatesta et al. | 395/600 |
| 5,455,945 | 10/1995 | VanderDrift | 395/600 |
| 5,546,304 | 8/1996 | Marschner et al. | 364/419.04 |
| 5,623,657 | 4/1997 | Conner et al. | 709/303 |

OTHER PUBLICATIONS

C. A. Schneider, "Table Update Serialization Technique", *IBM Technical Disclosure Bulletin*, vol. 21, No. 3, Aug. 1978, pp. 1158–1162.

Frank W. Allen, Mary E. S. Loomis and Michael V. Mannino, "The Integrated Dictionary/Directory System", *ACM Computing Surveys*, vol. 14, No. 2, Jun. 1982, pp. 245–286.

Batchelor, Dimmick and Rees, "Automatic Data Base Dictionary Creation and Maintenance During Program Creation or Modification", *IBM Technical Disclosure Bulletin*, vol. 26, No. 5, Oct. 1983, pp. 2466–2475.

*Primary Examiner*—Paul R. Lintz
*Attorney, Agent, or Firm*—Blakely, Sokoloff, Taylor & Zafman LLP

[57] ABSTRACT

A method of constructing a multi-lingual database includes the step of defining metadata to describe fields of a record as being either language-dependent or language-independent. The fields of the record are so described by flagging descriptions of columns associated with the fields in the metadata. A composite table, including a parent table and a child table, is then automatically generated. The parent table includes columns for the language-independent fields of the record, while the child table includes columns for the language-dependent fields of the record.

35 Claims, 34 Drawing Sheets

HARDWARE ITEMS TABLE

| ID | DESCRIPTION | UNITS OF MEASURE | ITEM CLASS | PRODUCT NO. |
|---|---|---|---|---|
| 1000 | HAMMERS | EACH | HIGH | 10 |
| 1001 | PLIERS | EACH | MEDIUM | 11 |
| 1002 | NAILS | POUND | LOW | 12 |

FIG. 1 (PRIOR ART)

COLUMN TYPE DEFINITIONS

| COLUMN TYPE | DATA TYPE | DATA LENGTH |
|---|---|---|
| AMOUNT | N | 15 |
| C10 | C | 10 |
| C15 | C | 15 |
| C2 | C | 2 |
| C3 | C | 3 |
| C40 | C | 40 |
| C5 | C | 5 |
| C50 | C | 50 |
| CONVERSION | N | 12 |
| CURRENCY | C | 3 |
| DATATYPE | C | 20 |
| DATE | D | 8 |
| DATETIME | D | 16 |
| DESCRIPTION | C | 255 |
| FACTOR | N | 16 |
| FLAG | C | 1 |
| ID | N | 10 |
| INT | N | 10 |
| LENGTH | N | 5 |
| LINT | N | 10 |
| N1 | N | 1 |
| N2 | N | 2 |
| N3 | N | 3 |
| N4 | N | 4 |
| NAME | C | 50 |
| OPERAMT | N | 16 |
| QUANTITY | N | 16 |
| SEQUENCE | N | 10 |
| SMALLINT | N | 5 |
| U1 | C | 1 |
| U10 | C | 10 |
| U2 | C | 2 |
| U20 | C | 20 |
| U25 | C | 25 |
| U255 | C | 255 |
| U3 | C | 3 |
| U30 | C | 30 |
| U4 | C | 4 |
| U40 | C | 40 |
| U8 | C | 8 |

EDIT COLUMN TYPE DEFINITION

[DELETE]

| | | |
|---|---|---|
| COLUMN TYPE: | AMOUNT | 102a |
| DATA TYPE | NUMERIC | 102b |
| DATA LENGTH: | 15 | 102c |
| MINIMUM LENGTH: | 0 | 102d |
| ALLOW NEGATIVES | | 102e |
| NUMBER PRECISION: | 15 | 102f |
| ORACLE8 DATA TYPE: | NUMBER (16, 4) | 102g |
| SCALE: | 4 | 102h |
| SQL SERVER 6.5 DATA TYPE: | MONEY | 102i |
| SUFFIX FLAG | | 102j |
| UPPERCASE FLAG | | 102k |

[RESET] [OK]

FIG.9

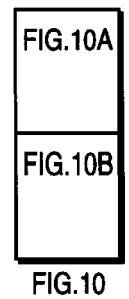

COLUMN DEFINITIONS

| CODE | COLUMN | DESCRIPTION | TYPE |
|---|---|---|---|
| ACCOUNTING_DATETIME | ABBREVIATION | ABBREVIATION VALUE | V20 |
| ABSENCETYPE | ABSENCE TYPE | ABSENCETYPE | U1 |
| ACCEPTED_QUANTITY | ACCEPTED QUANTITY | ACCEPTED QUANTITY | QUANTITY |
| ACCEPTED_UOM | ACCEPTED QUANTITY UNIT OF MEASURE | ACCEPTED QUANTITY UNIT OF MEASURE | UOM |
| ACCEPTED_UOM_ID | ACCEPTED QUANTITY UNIT OF MEASURE | ACCEPTED QUANTITY UNIT OF MEASURE | ID |
| ACCOUNTING_DATETIME | ACCOUNTING DATE AND TIME | ACCOUNTING DATE AND TIME | DATETIME |
| ACCTPERIOD | ACCOUNTING PERIOD | IS THE ACCOUNTING PERIOD THE DOCUMENT IS TO POST WITHIN. THE PERIOD IS WITHIN A FISCAL YEAR TO WHICH A BUSINESS TRANSACTION IS ASSIGNED. | N2 |

FIG. 10A

| ACCTTYPE | ACCOUNT TYPE | IS AN ACCOUNT CLASSIFICATION THAT SPECIFIES THE USE OF THIS ACCOUNT. SUGGESTED EXAMPLES OF ACCOUNT TYPE ARE: ASSET, EQUITY, EXPENSE, LIABILITY, REVENUE. | U1 |
|---|---|---|---|
| ACCTYEAR | ACCOUNTING YEAR | IS THE ACCOUNTING YEAR THE DOCUMENT IS TO POST WITHIN. GENERALLY A PERIOD OF 12 MONTHS FOR WHICH THE COMPANY REGULARLY HAS TO CREAT FINANCIAL STATEMENTS. A FISCAL YEAR MAY CORRESPOND TO A CALENDAR YEAR. | N4 |
| ACKCODE | ACKNOWLEDGE-MENT | REPRESENTS A LIST OF CODES THAT SPECIFY STATUS VALUES FOR THE ACKNOWLEDGEMENT. VALID CODES ARE: ACCEPTED, MODIFIED, REJECTED. SYNONYMS: ORDER STATUS, ORDER DISPOSITION | C10 |

FIG. 10B

EDIT COLUMN DEFINITION

| | | |
|---|---|---|
| COLUMN CODE: | ABBR | 106a |
| DESCRIPTION: | ABBREVIATION VALUE | 106b |
| PROMPT: | ABBREVIATION | 106c |
| COLUMN TYPE: | V20 | 106d |
| DEFAULT VALUE: | | 106e |
| DEFAULTING PROCEDURE: | NONE | 106f |
| VALIDATION PROCEDURE: | NONE | 106g |
| FOREIGN KEY TABLE: | NONE | 106h |
| MAX OCCURRENCES: | 1 | 106i |
| OAG FLAG: | | 106j |

FIG. 11

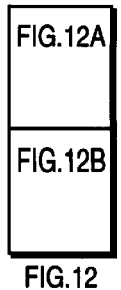

108

TABLE DEFINITIONS

| TABLE | DATA TYPE |
|---|---|
| ADDRESSES | A CENTRAL DEFINITION OF ALL ADDRESSES |
| BUSINESS_PARTNERS | BUSINESS PARTNERS; BOTH CUSTOMERS AND SUPPLIERS |
| BUYERS | BUYERS |
| CODES | CODES; VALID VALUES RELATED TO COLUMNS |
| COLUMN_TYPES | COLUMN TYPES, CONTAINS DATA TYPE, MIN AND MAX LENGTH, ETC. |
| COLUMNS | COLUMN DEFINITIONS, INCLUDING COLUMN TYPE AND FOREIGN KEY RELATIONSHIPS |
| COUNTRIES | ISO COUNTRY CODE DEFINITIONS |
| CURRENCIES | ISO CURRENCY DEFINITIONS |
| INSTALL | A SINGLE ROW TABLE CONTAINING INSTALLATION DIRECTORIES |
| INVENTORY | INVENTORY CONTROL TABLE |
| INVENTORY_HISTORY | HISTORY OF INVENTORY TRANSACTIONS |
| ITEM_PROPERTIES | PROPERTIES OR CHARACTERISTICS OF AN ITEM |
| ITEMS | ITEM (PART) DEFINITIONS |
| LANGUAGES | ISO AND MICROSOFT LANGUAGE DEFINITIONS |
| LOGINS | PRESENT AND HISTORICAL USER LOGINS |
| LOTLEVELS | LOTS - LEVELS 1 AND 2 |
| MESSAGE_LOG | LOG OF ALL MESSAGES GENERATED |
| MESSAGES | THE DEFINITION AND TEXT OF ALL MESSAGES |
| NAMES | A CENTRAL REPOSITORY OF VARIOUS NAMES |
| ORG_STRUCTURE | ORGANIZATIONAL HIERARCHY, BUILT FROM THE ORGS TABLE |
| ORGS | ORGANIZATIONAL DEFINITIONS |
| PLANNERS | PLANNERS |
| PROCEDURE_ARGUMENTS | THE ARGUMENT LIST FOR DEFINED PROCEDURES |
| PROCEDURE_TABLES | THE LIST OF TABLES UPDATED BY GENERATED PROCEDURES |
| PROCEDURES | DEFINITION OF STORED PROCEDURES BY PROCEDURE TYPE |

| | |
|---|---|
| PURCHASE_ORDER_LINES | PURCHASE ORDER LINES |
| PURCHASE_ORDER_SUBLINES | PURCHASE ORDER SUB LINES |
| PURCHASE_ORDERS | PURCHASE ORDER HEADERS |
| SALES_ORDER_LINES | SALES ORDER LINES |
| SALES_ORDERS | SALES ORDER HEADERS |
| SALESPEOPLE | SALES PEOPLE |
| SCREEN_ITEMS | A LIST OF ITEMS WITHINN A SCREEN TEMPLATE |
| SCREEN_TEMPLATES | A SCREEN DEFINITION |
| SCREEN_VIEWS | A LIST OF VIEWS ACCESSED WITHIN A SCREEN |
| SEGMENT_COLUMNS | THE COLUMNS WITHIN OAGIS SEGMENTS |
| SEGMENT_QUALIFIERS | THE QUALIFIERS WITHIN OAGIS SEGMENTS |
| SEGMENTS | OAGIS SEGMENTS |
| SITELEVEL_STRUCTURE | SITE LEVEL STRUCTURE |
| SITELEVELS | PHYSICAL SITES OR LOCATIONS |

FIG. 12B

EDIT TABLE DEFINITION

| | | |
|---|---|---|
| CODE: | ADDRESSES | 110a |
| MODIFIED SINCE LAST GENERATION: | NO | 110b |
| VERSION: | | 110c |
| CREATE INSERT ROUTINE: | | 110d |
| CREATE UPDATE ROUTINE: | | 110e |
| CREATE DELETE ROUTINE: | | 110f |
| TRANSACTION LOGGING: | LOG EVERYTHING ▽ | 110g |
| DESCRIPTION: | A CENTRAL DEFINITION OF ALL ADDRESSES. | 110h |
| TABLE COLUMNS: | MANAGE TABLE COLUMN DEFINITIONS | 110i |
| UNIQUE KEYS: | MANAGE UNIQUE KEY DEFINITIONS | 110j |

[DELETE]

[RESET] [OK]

FIG. 13

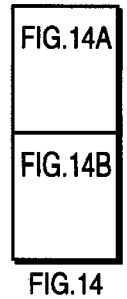

TABLE COLUMN DEFINITIONS FOR TABLE ITEMS

| BACK TO TABLE DEFINITION | | NEW TABLE COLUMN DEFINITION... |
|---|---|---|
| ACTIONS | COLUMN | DESCRIPTION |
| EDIT DELETE | AVGRUNSIZE_QUANTITY | AVERAGE RUN SIZE QUANTITY |
| EDIT DELETE | AVGRUNSIZE_UOM_ID | AVERAGE RUN SIZE QUANTITY UNIT OF MEASURE |
| EDIT DELETE | BOMID | BILL OF MATERIAL IDENTIFICATION CODE IS AN IDENTIFICATION CODE FOR A SPECIFIC BILL OF MATERIALS |
| EDIT DELETE | BOMREVISION | BOMREVISION IS THE REVISION NUMBER OR IDENTIFIER OF THE BILL OF MATERIALS |
| EDIT DELETE | COMMODITY | COMMODITY GROUP ARE CODES THAT IDENTIFY USER-DEFINED GROUPINGS OF ITEMS |
| EDIT DELETE | DESCRIPTN | DESCRIPTION IDENTIFIER IS A FREE-FORM DESCRIPTION OF THE TRANSACTION OR ANY PORTION OF THE TRANSACTION |
| EDIT DELETE | DRAWING | IDENTIFIES AN ENGINEERING DRAWING OR SPECIFICATION DEFINED BY THE BUYER. SYNONYM: BLUEPRINT, PARTS EXPLOSION |
| EDIT DELETE | EFFECTIVE_DATETIME | EFFECTIVE DATE AND TIME |
| EDIT DELETE | GLENTITYS | IS THE PRIMARY BALANCING SEGMENT OF THE GL ACCOUNT STRUCTURE. TYPICALLY, THIS IS THE OWNING ENTITY FOR THE TRANSACTION. P & L STATEMENTS ARE REQUIRED AT THIS LEVEL. SYNONYMS: BUSINESS UNIT, FUND, G/L COMPANY, ETC. |

FIG. 14A

| | | | |
|---|---|---|---|
| EDIT | DELETE | GLNOMACCT | "IS AN ENTRY IN THE GL CHART OF ACCOUNTS.IT IS THE ""WHAT"", NOT THE ""WHO"" OR ""WHERE"". EXAMPLES INCLUDE: ASSETS, OFFICE SUPPLIES, REVENUES, SALARIES, TRAVEL, SYNONYMS: ACCOUNT NUMBER, GL NATURAL ACCOUNT, ETC." |
| EDIT | DELETE | HAZRDMATL | HAZARDOUS MATERIAL CODE IDENTIFIES THE HAZARDOUS MATERIAL CODE FOR THE PRODUCT. VALID VALUES ARE DEFINED BY ISO. |
| EDIT | DELETE | ID | ID |
| EDIT | DELETE | ITEM | CONTAINS THE IDENTIFIER OF A PRODUCT OR SUBSTANCE THAT IS BOUGHT, SOLD, MANUFACTURED, DELIVERED, OR IS SOMEHOW HANDLED IN SIMILAR BUSINESS PROCESSES. SYNONYMS: MATERIAL, PART, RESOURCE ,STOCK KEEPING UNIT (SKU). |
| EDIT | DELETE | ITEMCLASS | ITEM CLASSIFICATION |
| EDIT | DELETE | ITEMDEFN | ITEM DEFINITION IS THE EXTENDED DESCRIPTION OF AN ITEM |
| EDIT | DELETE | ITEMDESC | ITEM DESCRIPTION CONTAINS THE ITEM DESCRIPTION |
| EDIT | DELETE | ITEMRV | IS THE REVISION CODE FOR AN ITEM. IT IS COMMONLY USED TO INDICATE ENGINEERING CHANGES TO THE ITEM OR PRODUCT. SYNONYMS: PRODUCT REVISION, ENGINEERING CHANGE NUMBER (ECN) |

FIG. 14B

EDIT TABLE COLUMN DEFINITION FOR TABLE ITEMS

| COLUMN: | DESCRIPTION |
|---|---|
| DESCRIPTION: | |
| PROMPT: | |
| DEFAULT VALUE: | |
| DEFAULTING PROCEDURE: | NONE |
| VALIDATION PROCEDURE: | NONE |
| LANGUAGE FLAG: | |
| NULLABLE FLAG: | |
| TRANSACTION LOGGING FLAG: | |

[CANCEL] [OK]

FIG. 15

UNIQUE KEY DEFINITIONS FOR TABLE ITEMS

| | | | |
|---|---|---|---|
| BACK TO TABLE DEFINITION | | NEW UNIQUE KEY DEFINITION... | |
| ACTIONS | KEY NUMBER | SEQUENCE | TABLE COLUMN DESCRIPTION |
| EDIT  DELETE | 1 | 1 | ORG ID |
| EDIT  DELETE | 1 | 2 | CONTAINS THE IDENTIFIER OF A PRODUCT OR SUBSTANCE THAT IS BOUGHT, SOLD, MANUFACTURED, DELIVERED, OR IS SOMEHOW HANDLED IN SIMILAR BUSINESS PROCESSES. SYNONYMS: MATERIAL, PART, RESOURCE, STOCK KEEPING UNIT (SKU). |

FIG. 16

PROCEDURE DEFINITIONS

| PROCEDURE | TYPE |
|---|---|
| ADDRESSES_C | CON |
| ADDRESSES_D | DEL |
| ADDRESSES_I | INS |
| ADDRESSES_U | UPD |
| BUILD | MAN |
| BUSINESS_PARTNERS_C | CON |
| BUSINESS_PARTNERS_D | DEL |
| BUSINESS_PARTNERS_I | INS |
| BUSINESS_PARTNERS_U | UPD |
| BUYERS_C | CON |
| BUYERS_D | DEL |
| BUYERS_I | INS |
| BUYERS_U | UPD |
| CODES_C | CON |
| CODES_D | DEL |
| CODES_I | INS |
| CODES_U | UPD |
| COLUMN_TYPES_C | CON |
| COLUMN_TYPES_D | DEL |
| COLUMN_TYPES_I | INS |
| COLUMN_TYPES_U | UPD |
| COLUMNS_C | CON |
| COLUMNS_D | DEL |
| COLUMNS_I | INS |
| COLUMNS_U | UPD |
| COUNTRIES_D | DEL |
| COUNTRIES_I | INS |
| COUNTRIES_U | UPD |
| CREATE_INSTALL | MAN |
| CREATE_PROC_CON | MAN |
| CREATE_PROC_DALL | MAN |
| CREATE_PROC_DEL | MAN |
| CREATE_PROC_IALL | MAN |
| CREATE_PROC_INS | MAN |
| CREATE_PROC_SUB | MAN |
| CREATE_PROC_UPD | MAN |
| CREATE_PROCEDURES | MAN |
| CREATE_TABLES | MAN |
| CREATE_TABLES_FROM_TABLES | MAN |
| CREATE_TABLES_FROM_TABS | MAN |

FIG. 18

| | |
|---|---|
| NAME: | ADDRESSES_C |
| PROCEDURE TYPE: | GENERATED CONTROL OF DATABASE UPDATES |
| TABLE: | ADDRESSES |
| KEY NUMBER: | |
| MODIFIED SINCE LAST GENERATION: | NO |
| PROCEDURE TABLES: | MANAGE DEFINITIONS |

EDIT PROCEDURE DEFINITION

DELETE          RESET   OK

FIG. 19

TABLE_VERSIONS

| ID | TABLE_CODE | VERSION |
|---|---|---|
| | | |
| 1092 | ORG_STRUCTURE | 3 |
| 1195 | ORG_STRUCTURE | 4 |
| | | |
| 1093 | ORGS | 3 |
| 1170 | ORGS | 4 |
| | | |
| | | |

TABLE_VERSION_COLUMNS ⟵ 98

| ID | TABLE_VERSION_ID | COLUMN_CODE | COLUMN_TYPE | NEGATIVE_ALLOWED_FLAG | NULLABLE_FLAG | ORACLE_DATATYPE |
|---|---|---|---|---|---|---|
| 3643 | 1092 | LEVEL_NUMBER | INT | X | (NULL) | NUMBER (10) |
| 3644 | 1092 | ORG_ID | ID | (NULL) | (NULL) | INTEGER |
| 3645 | 1092 | PARENT_ORG_ID | ID | (NULL) | (NULL) | INTEGER |
| 4968 | 1195 | LEVEL_NUMBER | SMALLINT | X | (NULL) | NUMBER (5) |
| 4969 | 1195 | ORG_ID | ID | (NULL) | (NULL) | INTEGER |
| 4970 | 1195 | PARENT_ORG_ID | ID | (NULL) | (NULL) | INTEGER |
| 3646 | 1093 | CURRENCY_ID | ID | (NULL) | (NULL) | INTEGER |
| 3647 | 1093 | DESCRIPTION | DESCRIPTION | (NULL) | X | VARCHAR2 (255) |
| 3649 | 1093 | NAME | NAME | (NULL) | (NULL) | VARCHAR2 (50) |
| 3650 | 1093 | NAME_ID | ID | (NULL) | X | INTEGER |
| 3651 | 1093 | PARENT_ORG_ID | ID | (NULL) | (NULL) | INTEGER |
| 4740 | 1170 | CURRENCY_ID | ID | (NULL) | X | INTEGER |
| 4741 | 1170 | DESCRIPTION | DESCRIPTION | (NULL) | X | VARCHAR2 (255) |
| 4742 | 1170 | NAME | NAME | (NULL) | (NULL) | VARCHAR2 (50) |
| 4743 | 1170 | NAME_ID | ID | (NULL) | X | INTEGER |
| 4744 | 1170 | PARENT_ORG_ID | ID | (NULL) | (NULL) | INTEGER |

FIG. 20B

LANGUAGE_CODE TABLE

| ID | LANG_CODE |
|----|-----------|
| 1  | AA        |
| 2  | AB        |
| 3  | AC        |
| ≈  | ≈         |
| 134 | XH       |
| 135 | YO       |
| 136 | ZH       |
| 137 | ZY       |

280
284  286

LANGUAGE_NAME TABLE

| ID | LANG_ID | LANG_NAME |
|----|---------|-----------|
| 1  | 1       | AFAR      |
| ≈  | ≈       | ≈         |
| 1  | 129     | AFAR      |
| 2  | 129     | ABKHAZIAN |
| 3  | 129     | AMHARIC   |
| ≈  | ≈       | ≈         |
| 134 | 129    | XHOSA     |
| 135 | 129    | YORUDA    |
| 136 | 129    | CHINESE   |
| 137 | 129    | ZULU      |
| ≈  | ≈       | ≈         |
| 137 | 137    | ISIZULU   |

CONSTRUCTING A BIFURCATED DATABASE OF CONTEXT-DEPENDENT AND CONTEXT-INDEPENDENT DATA ITEMS

FIELD OF THE INVENTION

The present invention pertains to the field of database generation, maintenance and utilization. More particularly, the present invention relates to a method of constructing a context-dependent database and of extracting database information to generate a context-dependent view of the database information.

BACKGROUND OF THE INVENTION

With the increasing globalization of business and trade, it is common practice for business organizations to establish manufacturing and/or distribution operations in a number of countries so as to better service local markets, and to utilize localize labor and natural resources.

Database systems are often crucial to the proper and efficient functioning of a business operation. The utilization of Manufacturing Resource Planning (MRP) and, more recently, Enterprise Resource Planning (ERP) systems to leverage database resources effectively has increased sharply as appreciation of the potential benefits of these systems has become recognized. The database systems employed by MRP and ERP systems are typically relational databases, which are commonly understood in the art to store information in tables which are linked by keys. An example of such a prior art table is designated generally at 1 in FIG. 1. The table 1 is comprised of a number of columns and rows, each row storing a record having a number of fields. Corresponding fields within the records define a column of the table 1. In this example, the table 1 stores records for items stocked by a hardware retailer.

A multinational company typically maintains a central database, to which all branch operations have access, or may alternatively provide mirror copies of a central database at each of the branch operations. In either case, it will be appreciated that local conditions at the branch offices will typically vary, and some of the data within a central database may be inappropriate for such local conditions. For example, currency denominations and language preferences may vary from location to location. In such cases, the adaptation of a central database to local conditions may require a specialist data programmer continually to update the database. For example, referring to table 1 a database expert may be required to replace the word "hammers" with a local translation in the table 1. In the case of large databases, this task may prove difficult, if not impossible, to perform. Further, the use of a database expert to make these types of modifications is undesirable from a cost and efficiency viewpoint.

One potential solution to the above mentioned problem is proposed in U.S. Pat. No. 5,442,782 to Malatesta et al., which teaches providing information from a multi-lingual database of language-independent and language-dependent items.

SUMMARY OF THE INVENTION

According to the invention, there is provided a method of constructing a database. Metadata that describes the fields of a record as being either context-dependent of context-independent is created. A context-independent table, excluding columns for the context-dependent fields of the record, is generated. Similarly, a context-dependent table, associated with the context-independent table and excluding columns for the context-independent fields of the record, is generated.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which:

FIG. 1 is a representation of a prior art table in a relational database.

FIG. 8 illustrates a view, according to the present invention, showing selected information regarding a number of rows within an exemplary COLUMN TYPES object.

FIG. 9 illustrates a user interface for generating and editing a COLUMN TYPE row for inclusion within the COLUMN TYPE object.

FIG. 10 illustrates exemplary COLUMN rows for inclusion within a COLUMNS object.

FIG. 11 illustrates a user interface for generating and editing a COLUMN row.

FIG. 12 illustrates a view listing various TABLE rows that may exist within a TABLES object.

FIG. 13 illustrates a user interface for editing a TABLE definition.

FIG. 14 illustrates a view of the contents of an exemplary row within a TABLES_COLUMNS object.

FIG. 15 illustrates a user interface for editing a TABLE COLUMN definition for table items.

FIG. 16 illustrates a view listing unique key definitions for an ITEMS table.

FIG. 18 illustrates a view listing various procedures that are included within a PROCEDURES object.

FIG. 19 illustrates a user interface by which a procedure definition may be edited.

FIGS. 20A and 20B are tables for TABLE_VERSIONS and TABLE_VERSION_COLUMNS objects.

FIG. 24 is a diagrammatic representation of a LANGUAGE_CODE table and a LANGUAGE_NAME table, according to an exemplary embodiment of the present invention.

DETAILED DESCRIPTION

A method of constructing a context-dependent database, and a method of generating a context-dependent view of this database, are described below. In the following description, for purposes of explanation, numerous specific details are set forth in order to provide a thorough understanding of the present invention. It will be evident, however, to one skilled in the art that the present invention may be practiced without these specific details.

NETWORK STRUCTURE

Figure 2A:
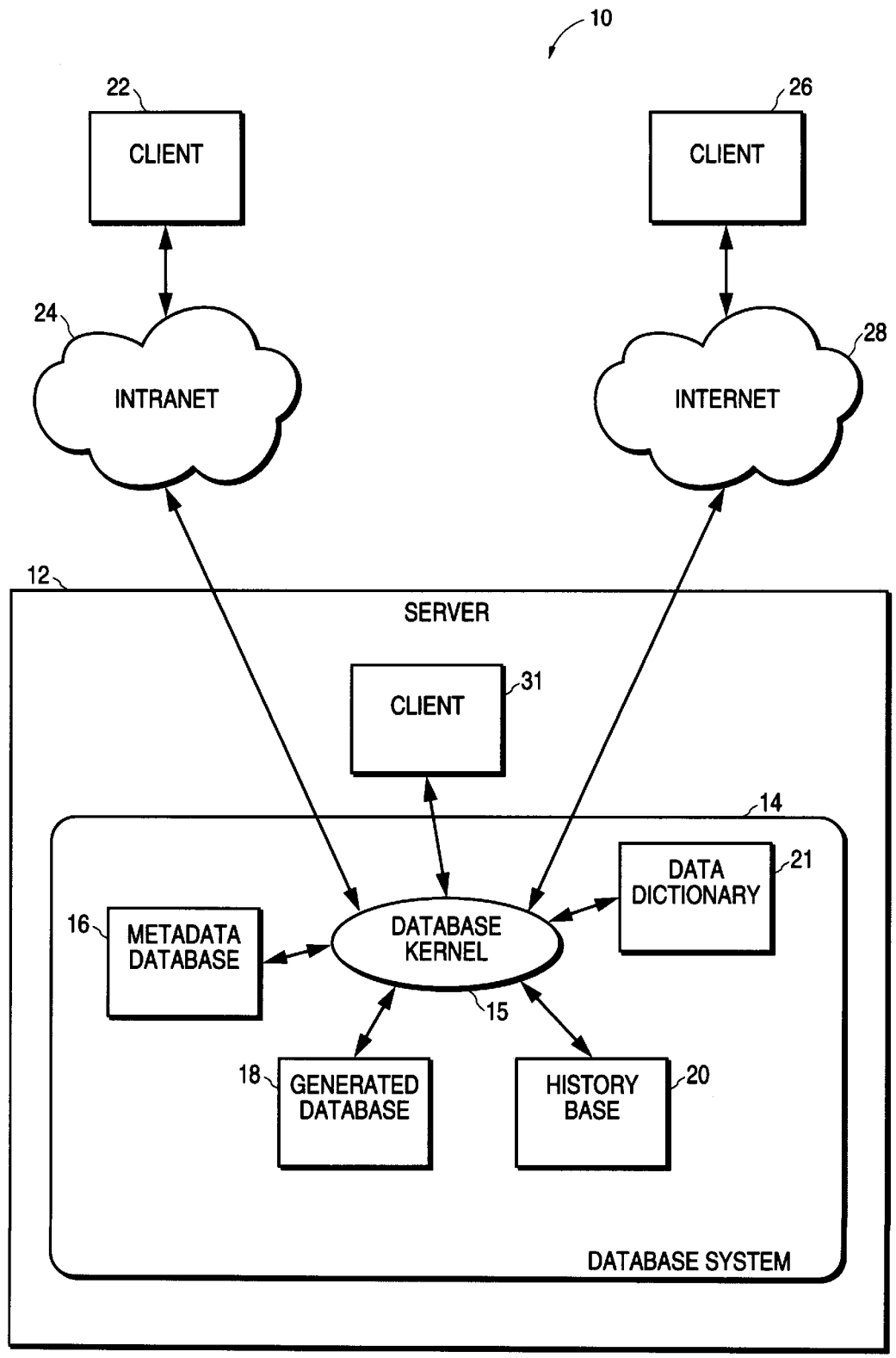
FIGS. 2A and 2B are diagrammatic representations of networks within which the present invention may be implemented.
Figure 2B:
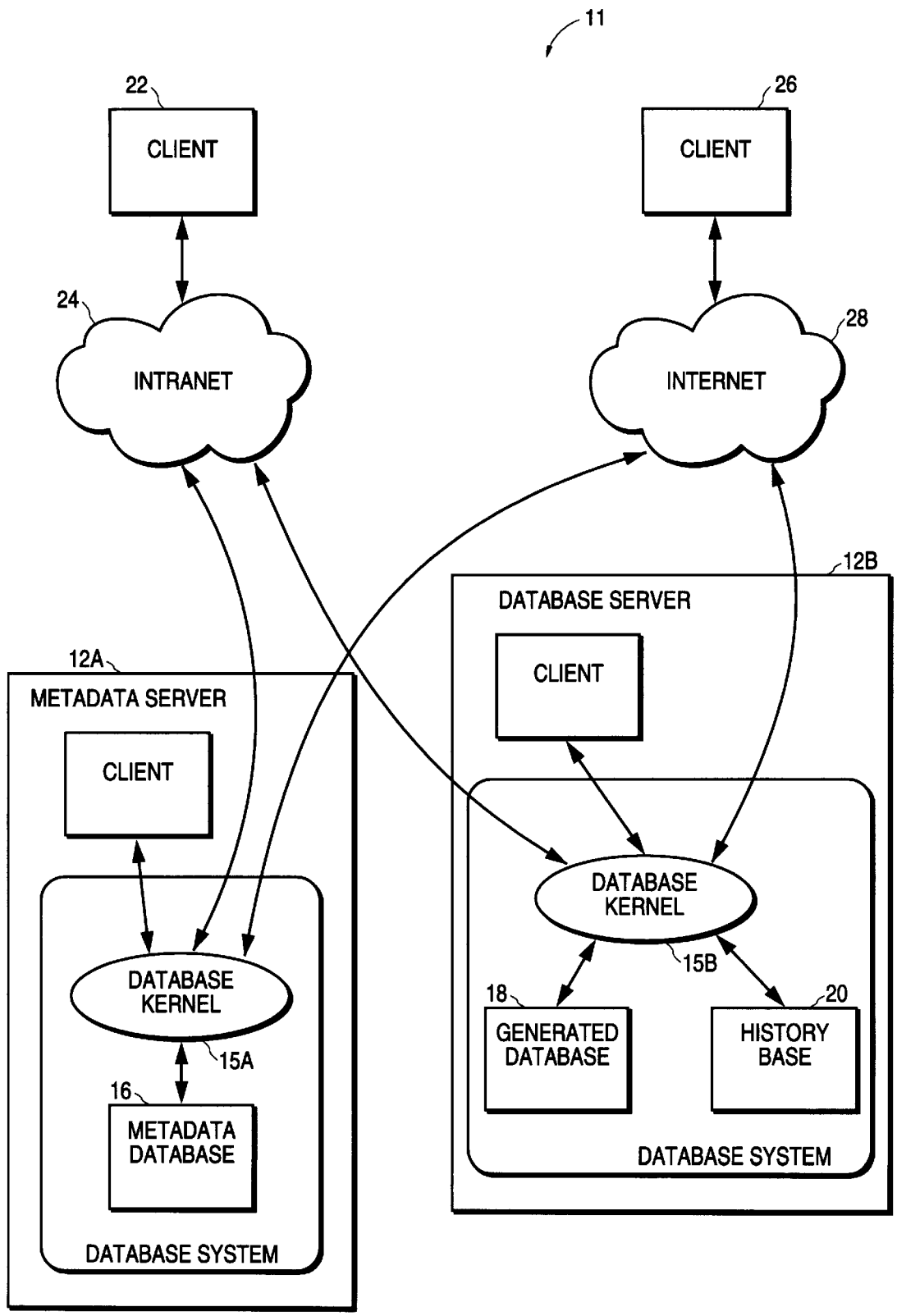

FIGS. 2A and 2B are diagrammatic representations of networks, designated generally at 10 and 11, within which the present invention may be implemented. The network 10 includes a single server 12 that hosts a client 31 and a database system 14. The database system 14 includes a database kernel 15, a metadata database 16, a generated relational database 18, a history base 20 and a data dictionary 21. Other well known components of the database system are not shown.

The database system 14 is shown to be accessible by a client 22 via an intranet 24, by a client 26 via the Internet, and also by the client 31 resident on the server 12. In one embodiment of the invention, each of the clients 22, 26 and 31 comprises a browser, such as the Navigator browser from Netscape Communications Corp. of Mountain View, Calif. or the Internet Explorer (IE) browser from Microsoft Corp. of Redmond, Washington State.

The database kernel 15 is responsible for facilitating access to the generated database 18, for the upgrading and modification of the database structure, and for the maintenance of the metadata database 16 as is described in further detail below. The database system 14 may for example comprise the Oracle 8 product from Oracle Corporation of Redwood Shores, Calif. or a SQL Server product from either Microsoft Corp. or Sybase, Inc. of Emeryville, Calif.

FIG. 2B illustrates an alternative network configuration within which the present invention may be implemented. The network 11 differs from the network 10 shown in FIG. 2A in that the metadata database 16 and the generated database 18 reside on different physical servers, namely a metadata server 12A and a database server 12B respectively.

PROGRAM AND DATA STRUCTURES

Referring now to FIG. 2, a more detailed representation of an exemplary database system 14 is shown. Specifically, more detailed representations of a metadata application dictionary 19 (that comprises part of the metadata database 16) and the generated database 18 are shown. The metadata application dictionary 19, which is distinct from a "data dictionary" 21 that may be defined within the database system 14, describes the respective structures of objects that comprise the generated database 18, as well as the relationships that are defined between the various database objects. The metadata application dictionary 19 typically comprises a collection of metadata objects in the form of tables (metatables) between which relationships are defined. The metadata objects (e.g., tables) describe the structure of objects within the generated database 18. For example, the metadata objects may describe the various columns that constitute a table within the generated database 18, and may further specify the format, type or other characteristics of these columns. As each table within the generated database 18 comprises a collection of records (or entries) having fields corresponding to columns of the relevant database table, the description of columns of tables by metadata objects is accordingly also a description of the fields of each record that comprise the database table. The metadata objects may also include management information pertaining to tables and columns of the generated database 18, such as description information. For the purposes of this specification, "metadata tables" shall be regarded as being "metadata objects" and the term "object" shall be regarded as being inclusive of the term "table".

The database system 14 is shown to include database management algorithms 17 in the form of build logic 40 and update logic 42. The database system 14 (specifically the build logic 40 and the update logic 42) utilizes the structures and relationships defined by metadata application dictionary 19 to generate and update the various objects that comprise the generated database 18. The build logic 40 is further shown to include a context-dependent build engine 41, the functioning and purpose of which will be described below. In short, the present invention proposes allowing a user to specify the structure of the generated database 18 in the metadata database 16 (and specifically in the metadata application dictionary 19), and then utilizing these specifications and relationships to generate and update the generated database 18. This is in contrast with prior art of systems, wherein the metadata database 16 is modified by the database kernel 15 responsive to the modification of database objects (such as the table, view, or stored procedure objects). The present invention thus requires that the structure of a generated database 18 be actively conformed to the descriptions and structures defined by the metadata database 16, as opposed to the prior art, where the descriptions contained in the metadata database 16 were generated from the structures in a generated database 18. Prior art, which teaches deriving metadata from the defined structures of objects within a database for the purposes of creating a repository of information describing the database, includes U.S. Pat. No. 4,805,099 (to Val J. Huber).

Figure 4:
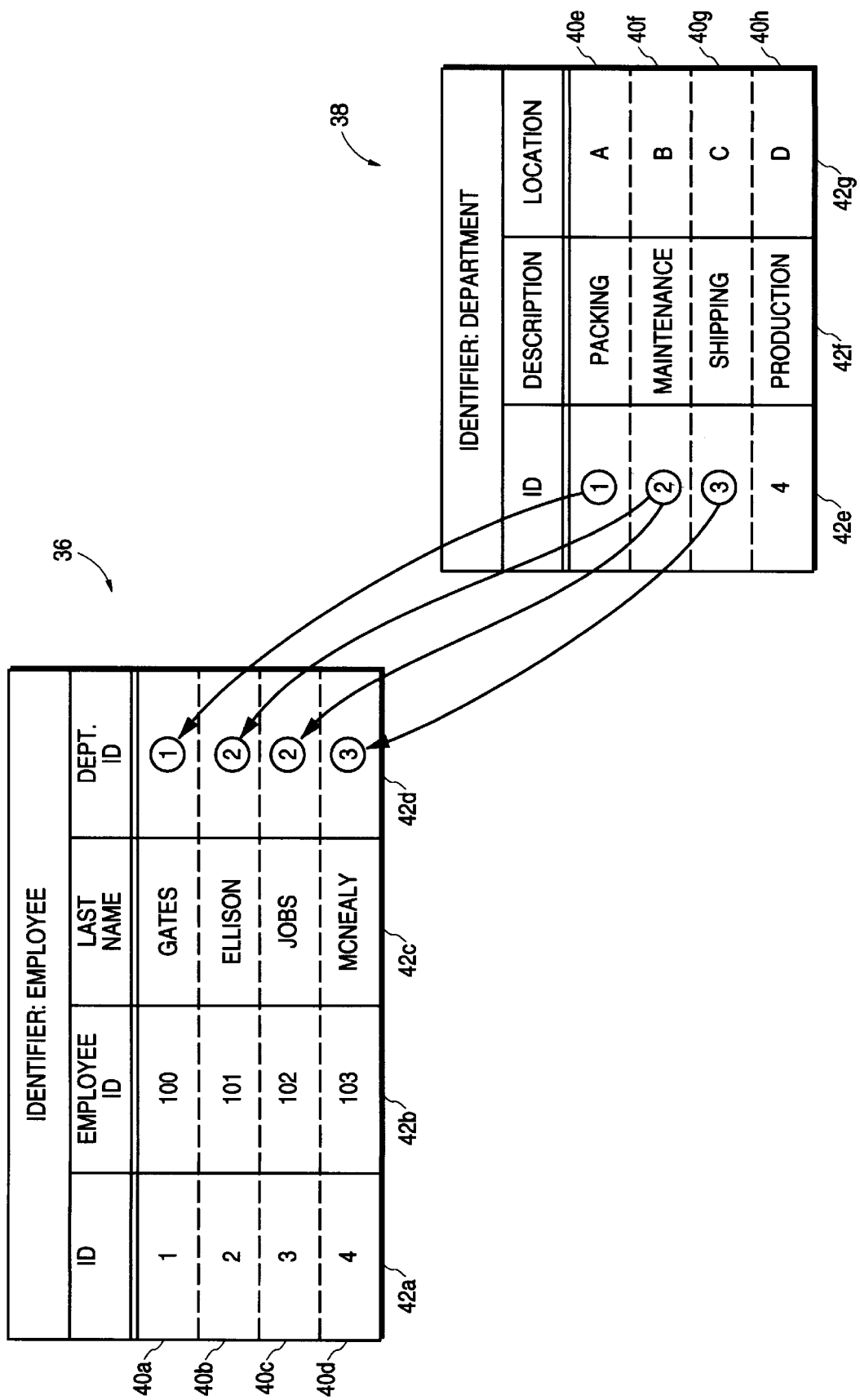
FIG. 4 illustrates two tables that may be included within a generated database according to the present invention.

The generated relational database 18 includes a number of the database objects, including table objects 30, view objects 32, and stored procedure objects 34. Each table object 30 comprises a collection of records, each record having number of fields. Each record is stored in a row of a respective table object 30, and each field of that record is assigned to an appropriate column. Each field thus occupies one column and each record occupies one row of a table object 30. FIG. 4 illustrates two exemplary tables, namely an employee table 36 and a department table 38. Each table has an identifier (e.g., EMPLOYEE or DEPARTMENT), and is shown to comprise a number of rows and columns. Specifically, the table 36 includes rows 40a–40d, and table 38 includes rows 40e–40h. The table 36 includes four columns, namely an ID column 42a, an employee ID column 42b, a last name column 42c, and a department ID column 40d. The department table 38 includes an ID column 42e, a description column 42f and a location column 42g. Each record of a table object 30 has a primary key that uniquely identifies that record. The primary key may be a unique field, or combination of fields, within a record. The ID column 42a contains entries that constitute respective primary keys for the records of employee table 36, while the ID column 42e includes entries that constitute respective primary keys for the records of the department table 38. In one embodiment of the present invention, the primary keys in columns 42a and 42e are "hidden" (i.e., not presented in any views) and are non-modifiable.

A record may further include a foreign key, which corresponds to the primary key of another table and accordingly establishes a relationship between a record of one table and a record of another table. The entries of the department ID column 42d of the table 36 comprise foreign keys, and correspond to primary key entries of the ID column 42e of the department table 38. Accordingly, it will also be appreciated that dependencies exist between table objects in a relational database. For example, the employee table 36 may be viewed as being dependent on the department table 38 for further information pertaining to an employee's department.

A column included within a table may further include one or more constraints regarding data that may be included within the column. Constraints are typically imposed to protect a relationship between data in two different tables. Accordingly, a unique (or primary) key constraint is a constraint imposed on a column that is the unique (or primary) key of a table, while a foreign key constraint is a constraint imposed on a column as a result of a unique key constraint of another table.

Figure 5:
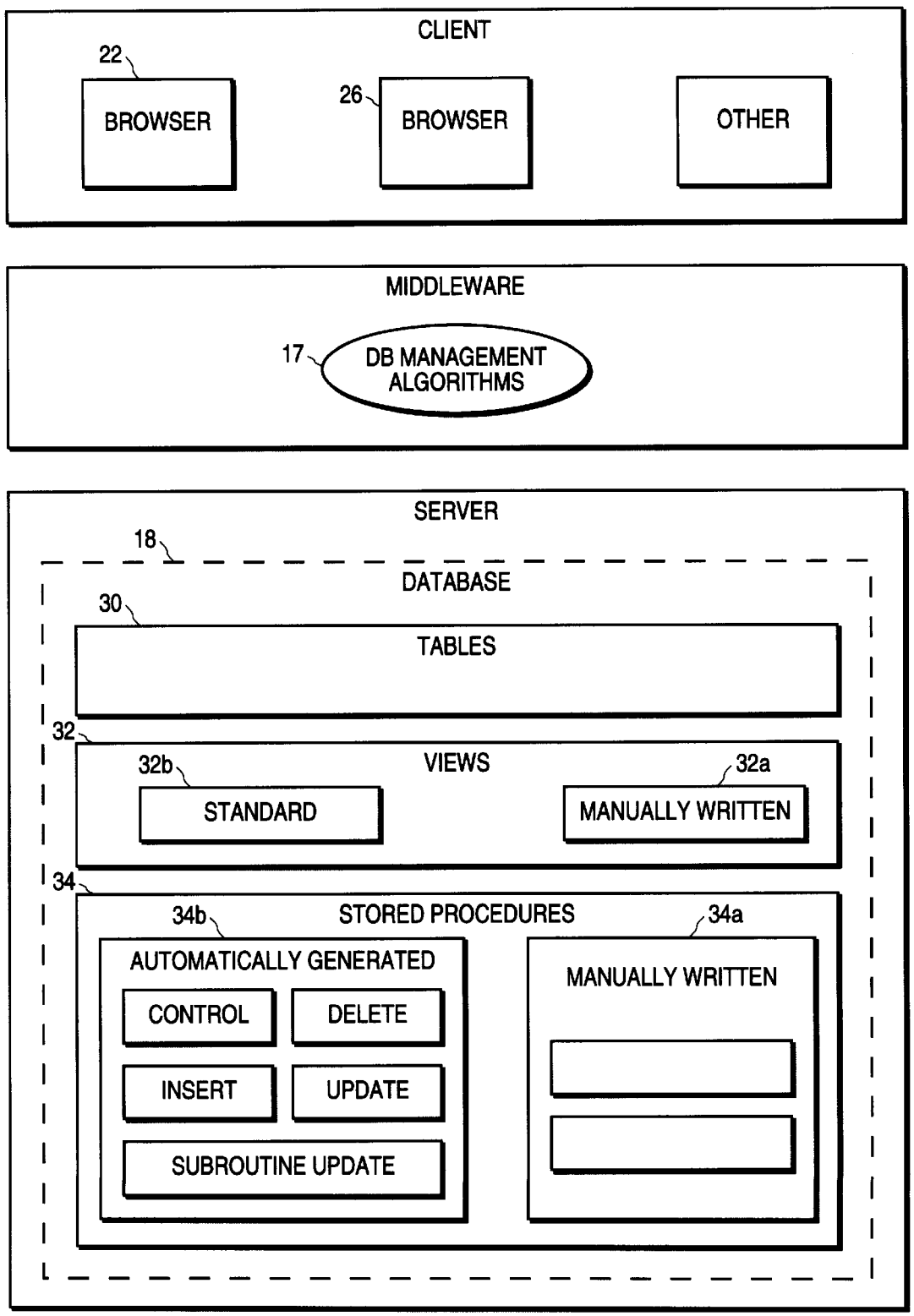
FIG. 5 is a block diagram illustrating further structural details of the database system shown in FIG. 3.

Returning now to FIG. 3, each view object 32 comprises a subset of data items, from one or more of the table objects 30, that is assembled in the server memory to satisfy the results of a Structured Query Language (SQL) statement. A view object 32 may thus be defined by a SQL statement, which retrieves specified date items from table objects 30 upon request, so as to provide selected information from the table object 30 to a user via a client. Referring to FIG. 5, the view objects 32 are shown to include both standard views 32b, which may automatically be updated according to the teachings of the present invention, and manually written views 32a, which may or may not be included within the view objects 32. Both the manually written and automatically generated views may automatically be updated by the update logic 42 of database system 14.

Stored procedure objects 34 typically comprise programs (or code segments) that are stored in the generated database 18 and that perform essential functions relating to the database system 14. For example, a stored procedure object 34 may comprise a program for extracting pertinent information from a table object 30, and then generating a personalized letter to a customer containing information retrieved from the table objects 30. A stored procedure object 30 may be triggered by a user-specified trigger event pertaining to the generated database 18. As shown in FIG. 5, stored procedure objects 34 may broadly be classified as being either manually written stored procedures 34a or automatically generated stored procedures 34b, which are generated according to the teachings of the present invention by the build logic 40 of the database system 14. The automatically generated (or code-generated) stored procedures 34b include control procedures, insert procedures, delete procedures, update procedures and subroutine update procedures. Both the manually written and automatically generated procedures may be automatically updated by the update logic 42 of database system 14. Table 1 specifies, for an exemplary generated database 18, procedure definitions by procedure type.

TABLE 1

| Procedure Type | Description | How Defined | How Generated |
| --- | --- | --- | --- |
| MAN (Manual) | Manually Written Procedure | Manually | Manually |
| DEF (Defaulting) | Defaulting Procedure | Manually | Manually |
| VAL (Validation) | Validation Procedure | Manually | Manually |
| CON (Control) | Generated Control of Database Updates | Manually | Build + Upgrade Logic |
| SUB (Update Subset) | Generated Table Subset Update Procedure | Manually | Build + Upgrade Logic |
| INS (Insert) | Generated Standard Table Insert Procedure | Generated | Build + Upgrade Logic |
| UPD (Update) | Generated Standard Table Update Procedure | Generated | Build + Upgrade Logic |
| DEL (Delete) | Generated Standard Table Delete Procedure | Generated | Build + Upgrade Logic |

Table 2 lists a number of stored procedure objects, in the "Associated Definitions" column, that are included in an exemplary database described below with reference to FIG. 6.

TABLE 2

| Procedure Type | Associated Definitions | How Associated Definitions Defined |
| --- | --- | --- |
| MAN (Manual) | Procedure_Columns | Automatically when compiled |
| | Procedure_Columns_Types | Automatically when compiled |
| | Procedure_Dependencies | Automatically when compiled |
| | Procedure_Views | Automatically when compiled |
| DEF (Defaulting) | Procedure_Columns | Automatically when compiled |
| | Procedure_Columns_Types | Automatically when compiled |
| | Procedure_Dependencies | Automatically when compiled |
| | Procedure_Views + | Automatically when compiled |
| | Procedure_Arguments | Manually |
| VAL (Validation) | Procedure_Columns | Automatically when compiled |
| | Procedure_Columns_Types | Automatically when compiled |
| | Procedure_Dependencies | Automatically when compiled |
| | Procedure_Views + | Automatically when compiled |
| | Procedure_Arguments | Manually |
| CON (Control) | Procedure_Tables | Manually |
| SUB (Update Subset) | Procedure_Arguments | Manually |
| INS (Insert) | Tables (Insert Flag) | Manually |

TABLE 2-continued

| Procedure Type | Associated Definitions | How Associated Definitions Defined |
|---|---|---|
| UPD (Update) | Tables (Update Flag) | Manually |
| DEL (Delete) | Tables (Delete Flag) | Manually |

Procedure types CON, DEL, INS, SUB, and UPD are code-generated Stored Procedures. Procedure types CON and SUB Stored Procedures are generated from the Procedures Table definitions. Procedure types DEL, INS and UPD Procedures Table definitions are automatically updated as the Stored Procedures are generated. Procedure types CON, DEF, MAN, SUB and VAL Procedures Table definitions must be manually updated. Procedure types DEL, INS, MAN, and UPD have only Procedures Table entries. Procedures type CON has Procedures (mandatory) and Procedure_Tables (optional) Table entries. Procedure types DEF, SUB and VAL have Procedures and Procedure_Arguments Table entries.

The stored procedures include a context-dependent view engine 35, the functioning of which will be described in further details below.

Figure 6:
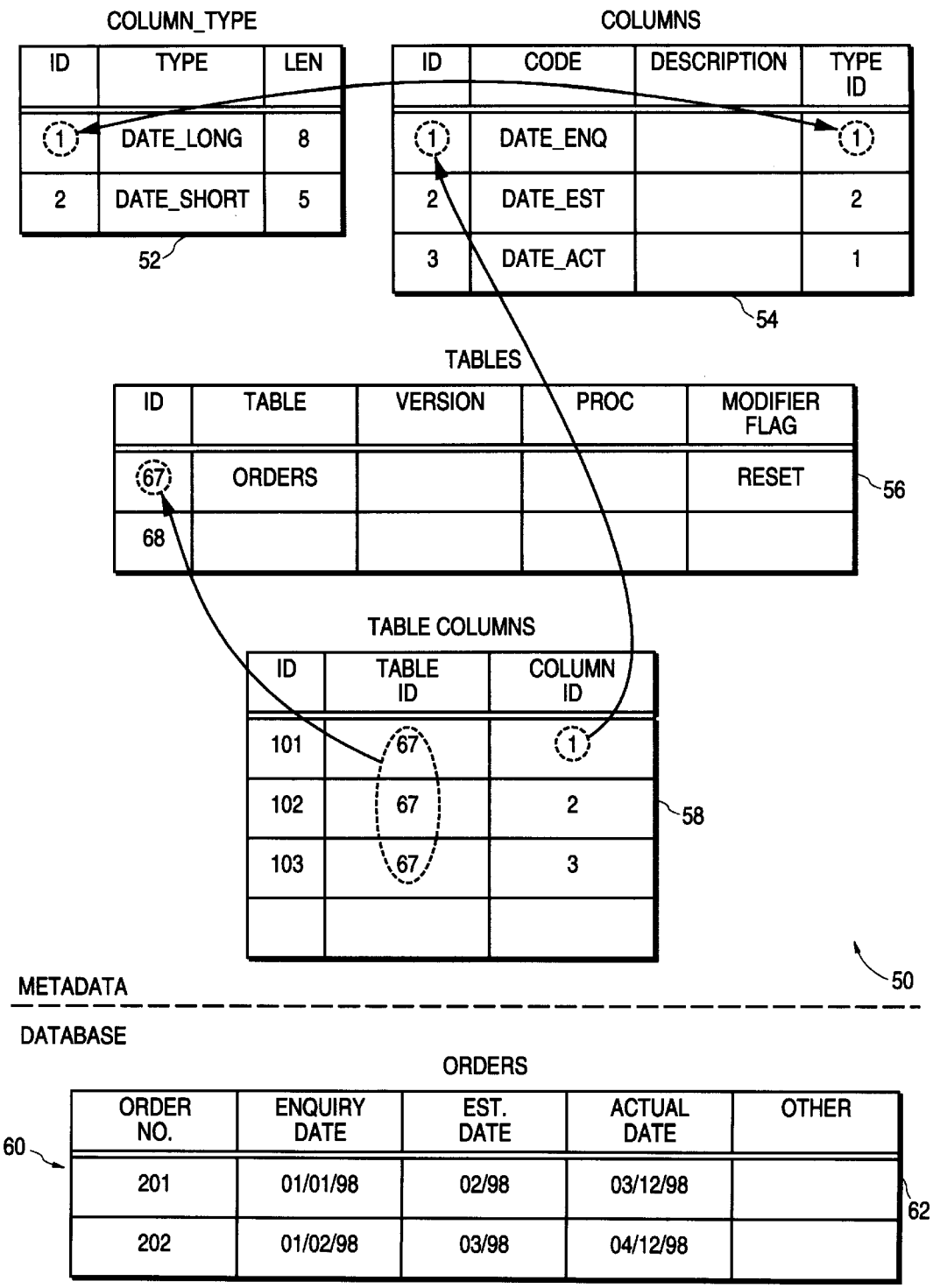
FIG. 6 is a diagrammatic representation of a portion of an exemplary metadata database according to one embodiment of the present invention.

FIG. 6 provides a diagrammatic representation of a portion of an exemplary metadata database 50. The metadata database 50 is shown to include a number of table objects similar in structure to the table objects that comprise the generated database 18. The table objects of the metadata database 50 include records specifying structural, description and management information for objects within an associated relational database 60. The exemplary metadata database 50 comprises a COLUMN_TYPE object 52, a COLUMNS object 54, a TABLES object 56, and a TABLE_COLUMNS object 58. The COLUMN_TYPE object 52 specifies format information for various column types, and is shown to include three columns, namely an ID column, a type column and a length column. Two records are shown to exist in the object 52, these records specifying respective data lengths for a long date column type and a short date column type. The COLUMNS object 54 is shown to comprise four columns, namely an ID column, a code column, a description column and a type column. The COLUMNS object 54 includes records for inquiry date, estimated delivery date and actual delivery date columns which may be included within any of the tables of the database 60. The code column stores code names for the respective columns, the description column stores respective descriptions for the relevant columns, and the type column stores information specifying a column type attributed to each column. The inquiry date and actual delivery date column records are shown to have been attributed the long date column type, whereas the estimated delivery date column record is shown to have been attributed the short date column type. The TABLES object 56 is shown to specify an ID and a name (e.g., ID "67" and name "ORDERS") for each of the tables included in the relational database 60, and also includes various descriptive and management information pertaining to each table. The TABLE_COLUMNS object 58 provides a mapping of columns to a particular table ID, and thus specifies which columns are included within each table. Accordingly, the ORDERS object 62 of the relational database 60 is shown to include the inquiry date, the estimated delivery date, and the actual delivery date columns as defined in the COLUMNS object 54.

The build logic 40 and update logic 42 include sequences of instructions that are executed by a processor of the server 12, and cause the processor to utilize the information contained within the TABLE_COLUMNS object 58, and also information within the objects 52, 54, and 56 upon which the TABLE_COLUMNS object 58 is dependent, to generate and update the ORDERS object 62 within the relational database 60. This is the reverse of the methodologies and logic taught in the prior art, where metadata is generated from existing objects within the database to provide a readily accessible description of the database. The present invention is particularly advantageous in that it allows a database manager to make changes to the database object descriptions within the metadata database 50, and these modified descriptions are then utilized to modify objects (e.g. table, view and stored procedure objects) within the relational database 60.

For example, if a database manager wishes to change the format of all estimated delivery date columns within the database 60, the manager could simply alter the type specification in the COLUMNS object 54 to reflect the long date format. Accordingly, all records within the TABLE_COLUMNS object 58 that specify the estimated date column, and that are accordingly dependent on the COLUMNS object 54, would by reason of their dependencies include this updated information. Accordingly, objects may be generated and/or updated in the database 60 by the build and update logics 40 and 42 to reflect this modification. Similarly, a database manager could alter the length of the long date format from eight to nine characters, and this change would be propagated to all relevant objects within database 60 by reason of the dependencies that exist within the metadata database 50. The present invention is thus furthermore advantageous in that modifications are also made only to relevant objects within the database 60, and the modification process is accordingly "incremental" in nature. The ease with which modifications can be made to the database 60 is facilitated by the dependencies that are defined between the various objects that comprise the metadata, and by the use of metadata to generated and update structures and relationships of objects within the database 60.

Figure 7:
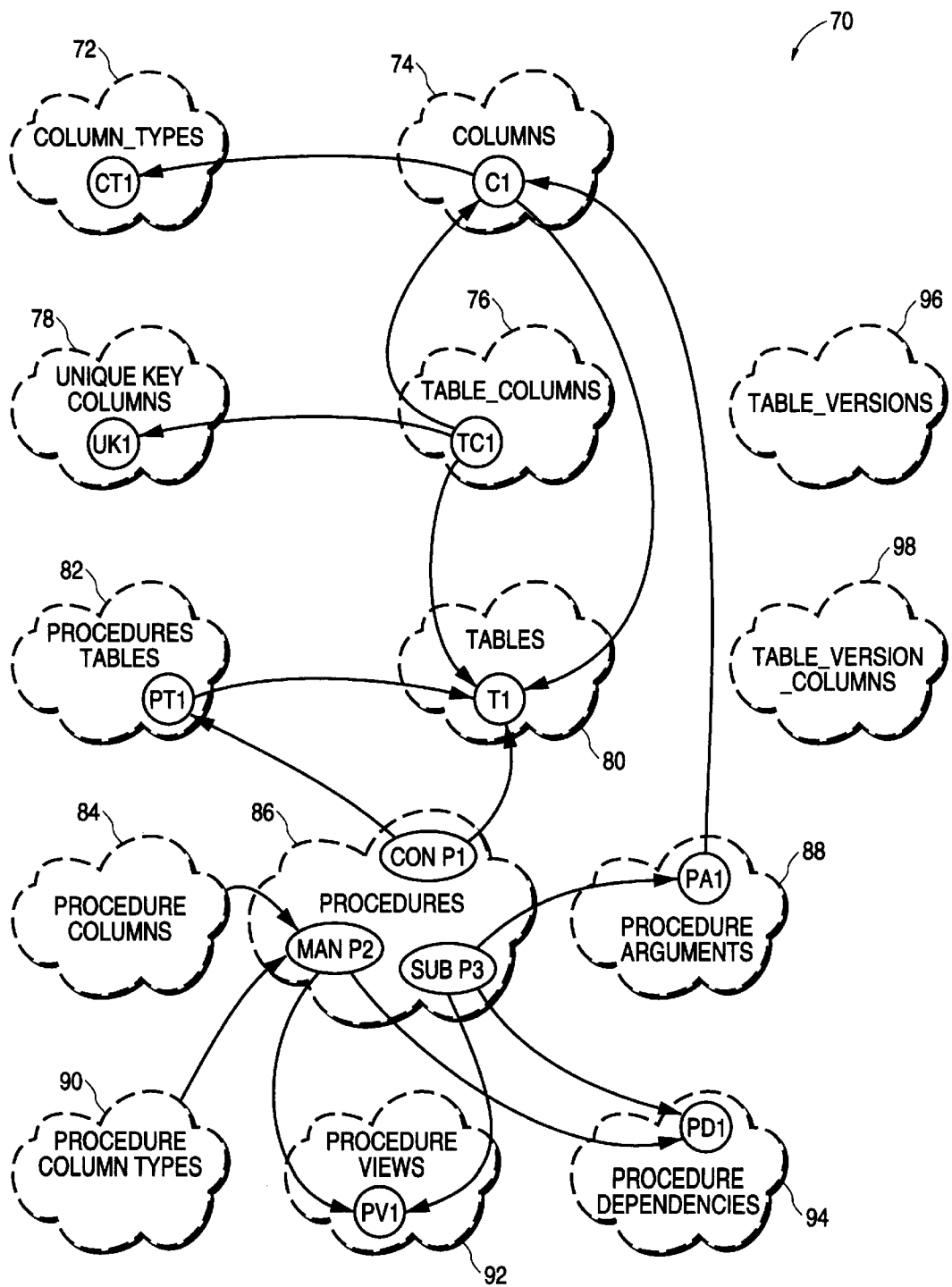
FIG. 7 is a Booch notation diagram depicting an exemplary metadata database according to one embodiment of the present invention.

In an exemplary embodiment, the generated database 18 and database system 14 may be utilized to implement an Enterprise Resources Planning (ERP) system. FIG. 7 illustrates a Booch notation diagram depicting an exemplary metadata database 70 that may be utilized to describe a generated database (not shown) for implementing the ERP system. Metadata objects (i.e., metadata tables) are represented in broken line, and rows or records (i.e., instances of these objects) are represented by circles and are shown to be included in respective table objects. Each row (or record) in each metadata object (e.g., row T1 in object TABLES) represents a table (i.e., object) in the relational database 60 and also a view (i.e., yet a further object). The objects shown to be included within the metadata database 70 include a COLUMN TYPES object 72, a COLUMNS object 74, a TABLE_COLUMNS object 76, a UNIQUE KEY COLUMNS object 78, a TABLES object 80, a PROCEDURE TABLES object 82, a PROCEDURE COLUMNS object 84, a PROCEDURES object 86, a PROCEDURE ARGUMENTS object 88, a PROCEDURE COLUMN TYPES object 90, a PROCEDURE VIEWS object 92 and a PROCEDURE DEPENDENCIES object 94.

Arrows depict various dependencies that exist between the rows (or records) of metadata objects. For example, the TABLE_COLUMNS object row TC1 is shown to be dependent on the COLUMNS OBJECT row C1, the TABLES object row T1 and the UNIQUE KEY COLUMNS object row UK1 in a manner analogous to that described above with reference to FIG. 6.

A brief description of each of the objects 72–94 will now be provided, with reference to FIG. 7 in conjunction with FIGS. 8–19. Turning first to the COLUMN TYPES objects 72, this object includes a number of rows that specify type and format information that can be referenced by a column to attribute the required type and format characteristics to the referencing column. FIG. 8 illustrates a view 100 showing selected information from a number of rows within an exemplary column types object 72. FIG. 9 illustrates a user interface 102 by which a user can generate and edit a COLUMN TYPE row for inclusion within the COLUMN TYPE object 72. The information that can be included within a COLUMN TYPE row is apparent from the input fields displayed in the user interface 102. Specifically, each COLUMN TYPE row includes an identifier (e.g., a name), that comprises the "column type" input 102a. This identifier uniquely identifies each COLUMN TYPE row. A user further has the option of attributing a specific data type (i.e., a numeric, character or date type) and data length to the COLUMN TYPE row via input fields 102b and 102c. Also of interest is the ability by a user to specify data types, via input fields 102g and 102i, for both Oracle 8 and SQL Server databases. This feature is particularly useful in converting a database table from an Oracle 8 format to a SQL Server format, or vice versa.

A view 104 illustrating exemplary COLUMNS rows included within the COLUMNS object 74 is shown in FIG. 10. Each COLUMNS row listed in the view 104 includes a column code, shown at 104a, by which the COLUMNS row is uniquely identified. Each COLUMNS row is furthermore shown to include a type specified, displayed in column 104d, that corresponds to a COLUMN TYPES row included within the COLUMN TYPES object 72. FIG. 11 illustrates a user interface 106, utilizing which a user can generate and edit a COLUMNS row. As illustrated, a user can input and modify column code and column type information via fields 106a and 106d respectively. Also of interest is the input field 106h, via which a user can specify a foreign key table within the database.

FIG. 12 illustrates a view 108 listing various table rows that exist within the TABLES object 80. FIG. 13 illustrates a user interface 110, via which a user may edit a table definition. For example, a user may specify a unique identifier code in an input field 110a.

FIG. 14 illustrates a view of the contents of exemplary rows within the TABLE_COLUMNS object 76. The rows from which the view 112 is extracted map a number of columns defined by rows within the COLUMNS objects 74 to a TABLES row within the TABLES object 80. A row for the ITEMS table, within the TABLES object 80 and listed in the view 108 of FIG. 12 (at 108a), is associated with a number of COLUMNS rows listed in column 112a and included within the COLUMNS object 74. FIG. 15 illustrates a user interface 114 using which a user can input and modify information pertaining to each of the columns listed within a TABLE_COLUMNS row.

Figure 17:
FIG. 17 illustrates a user interface for editing unique key definitions for table ITEMS.

FIG. 16 illustrates a view 116 listing unique key definitions for the ITEMS table, while FIG. 17 illustrates a user interface 118 using which the unique key definitions for a specific table within the database can be inputted or updated. The user interface 118 provides a table column field 118a at which a user can identify columns within a table to comprise unique key columns for that table.

FIG. 18 illustrates a view 120 listing exemplary procedures that are included within the PROCEDURES objects 86. The view 120 provides a first column 120a in which an identifier for each procedure is listed, and a second column 120b in which a type characteristic for each procedure is identified. Specifically, each procedure is shown to be identified as being a control (CON), a delete (DEL), an insert (INS), an update (UPD) or a manually written (MAN) procedure type. Each procedure may be identified as being any one of the procedure types listed above in Table 1.

Each table object within the database may have one or more procedures associated therewith for performing control, deletion, insertion, updating and other operations with respect to the relevant table object. For example, the control procedure CON P1 of the PROCEDURES object 86 is shown in FIG. 7 to be related to, and to depend from, the TABLE row T1 within the TABLES object 80.

FIG. 19 illustrates a user interface 122 through which a user can specify a particular procedure type for a procedure at field 122b, and define a foreign key relationship between the relevant procedure object and a table object at field 122c.

Referring again to FIG. 7, the metadata database 70 finally also includes TABLE_VERSIONS and TABLE_VERSION_COLUMNS objects 96 and 98 that include records logging modifications made to objects within the generated database, via the metadata. Examples of the objects 96 and 98 are provided in FIGS. 20A and 20B. The examples provided log modifications that were made to ORG_STRUCTURE and ORGS tables, which are included within an exemplary relational database 60, between versions 3 and 4.

The TABLE_VERSIONS table 96 illustrated in FIG. 20A contains a record (or row) for each version of the relevant tables that has existed. Each record has an identifier (ID) associated therewith by which the version of the table is identified. For example, the ORG_STRUCTURE table, version 3, is identified by the ID 1092 while version 4 of this table is identified by the ID 1195.

The TABLE_VERSION_COLUMNS table 98 illustrated in FIG. 20B includes a record for each column within each of the relevant tables, and records specific details regarding each of these columns. By comparing records for a specific column that were created for different versions of a relevant table, modifications to a column are recognized. For example, between versions 3 and 4 of the ORG_STRUCTURE table, the LEVEL_NUMBER column was changed from an integer (INT) data type with a length of 10 to a small integer (SMALLINT) data type with a length of 5. Further, in the ORGS table, the CURRENCY_ID column changed from being NOTNULLABLE to being NULLABLE from version 3 to version 4. These modifications are documented in FIG. 20B.

CONTEXT-DEPENDENT AND CONTEXT-INDEPENDENT TABLES

Figure 21A:
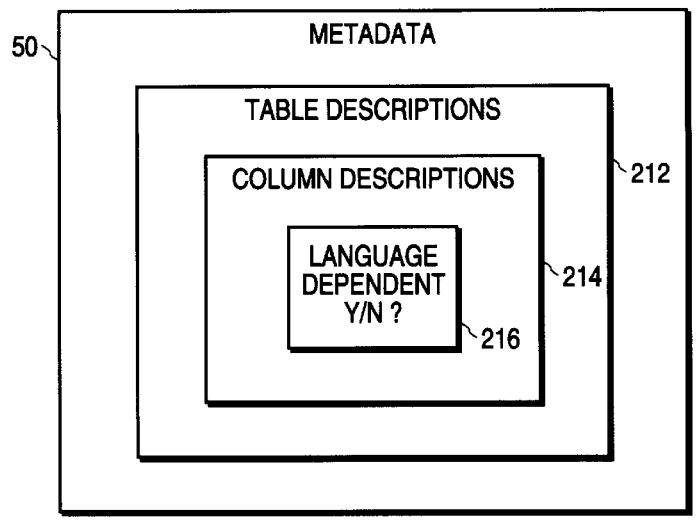
FIG. 21 is a diagrammatic representation of metadata including context-dependent indications, and a relational database according to one embodiment of the invention, including both context-independent and context-dependent tables.
Figure 21B:
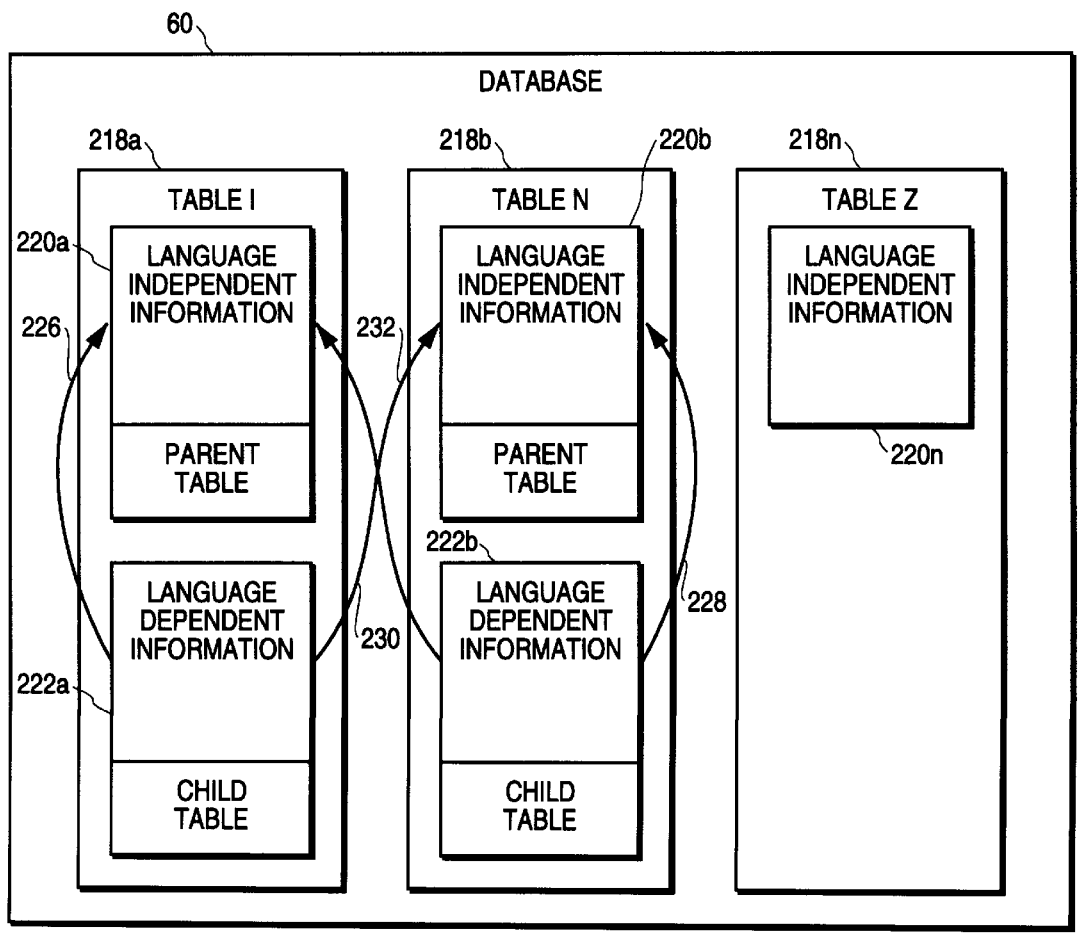

As discussed above with reference to FIG. 6, metadata database 50 essentially comprises files or tables that define and describe the structure of tables within the relational database 60. Referring now to FIG. 21, the present invention proposes the creation of metadata database 50 that may describe the fields of a record within the relational database 60 as being either context-independent or context-dependent. Referring to FIG. 21, the metadata database 50 is accordingly shown to include table descriptions 212 that describe the structure of tables within the relational database 60 and, more specifically, specify which columns are included within which tables. The table descriptions 212 in turn include column descriptions 214, which further describe the properties of the columns which constitute the tables. Inter alia, the column descriptions 214 specify whether the content of each columns is context-dependent or context-independent. For the purposes of the present specification, the term "context" may be taken as referring to any parameter or characteristic that may result in varying information requirements. For example, the term "context" may refer to a language context, a geographical context, a user context or a systems context. As illustrated in FIG. 21 at 216, in the exemplary embodiment the table column description indicates whether the various table columns are language-dependent or language-independent.

As stated above, the build logic 40 and the update logic 42 include sequences of instructions that are executed by a processor of a server 12, and cause the processor to utilize metadata database 50 to generate and/or update tables within the relational database 60. According to the teachings of the present invention, the build and update logics 40 and 42 utilize the indications in the table column descriptions 214 in the metadata database 50 to construct composite tables 218A–218N within the relational database 60, as illustrated in FIG. 21. Specifically, each composite table 218 may comprise a parent context-independent table 220 and a child context-dependent table 222. Each context-independent table 220 includes columns only for those fields of a record that are context-independent. The context-independent tables 220 may nonetheless include other columns, such as identifier columns that are neither context-dependent or context-independent (i.e., context-neutral) and that are merely utilized for table structure and order. Similarly, the context-dependent tables 222 include only columns for those fields of a record that are context-dependent. The context-dependent tables 222 may further include other columns, such as an identifier column, that are neither context-dependent or context-independent for ordering and linking purposes.

In one exemplary embodiment of the present invention, the records within a context-independent table 218 are linked to corresponding records within a context-dependent table 222 by keys in the form of record identifiers. Further, records within a context-dependent table 222 may be keyed or indexed to records within a context-independent table 220 not directly associated with the context-dependent table 222, as indicated by arrows 230 and 232. Certain composite tables 218N may furthermore be defined within the metadata database 50 as including only context-independent columns.

Figure 22:
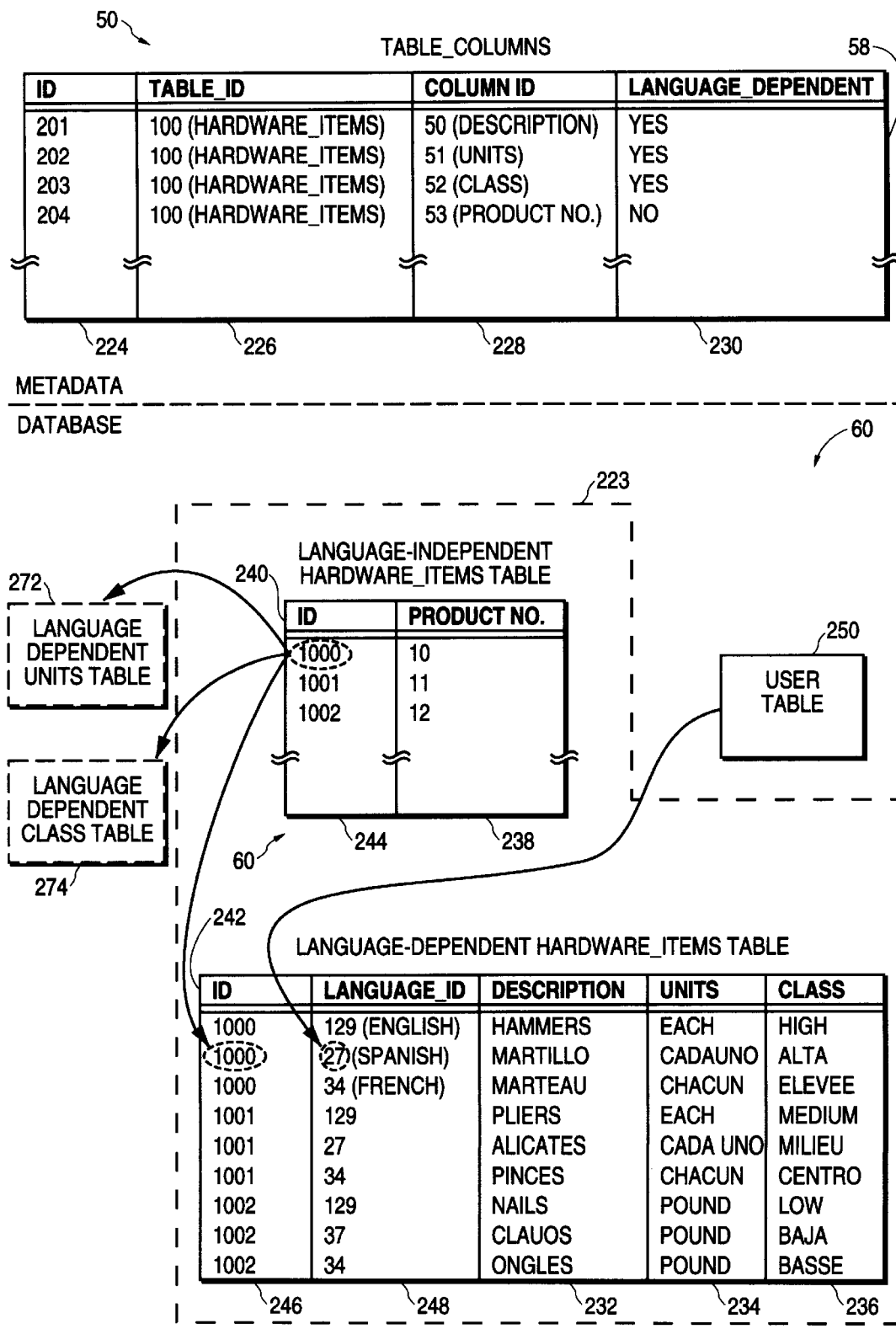
FIG. 22 is a diagrammatic representation of an exemplary embodiment of the metadata and relational database shown in FIG. 21.

FIG. 22 provides an exemplary embodiment of the data structures illustrated in FIG. 21. Specifically, the metadata database 50 is shown to include the TABLE_COLUMNS object 58, which provides a mapping of columns to a specific table. Only the portion of the TABLE_COLUMNS object 58 specifying the columns to be included within a composite table, namely a HARDWARE_ITEMS table 223, within the relational database 60 is shown. The TABLE_COLUMNS object 58 includes an ID column 224 containing a record identifier for each record, a TABLE_ID column 226 including an identifier for each table within the relational database 60, a COLUMN_ID column 228 including a column identifier for each column to be included in the table indicated by the entry in the corresponding TABLE_ID column 226, and a LANGUAGE_DEPENDENT column 230 containing an indication as whether the column identified by the column identifier in the corresponding COLUMN_ID column 228 is language-dependent or not. The illustrated portion of the TABLE_COLUMNS object 58 indicates that the composite HARDWARE_ITEMS table 222 in the database 60 includes a DESCRIPTION column 232, a UNITS column 234 and a CLASS column 236, each of the columns 232, 234 and 236 being identified as language-dependent. The HARDWARE_ITEMS table 223 is furthermore indicates the table 222 as including a PRODUCT_NUMBER column 238 that is language-independent.

Figure 23:
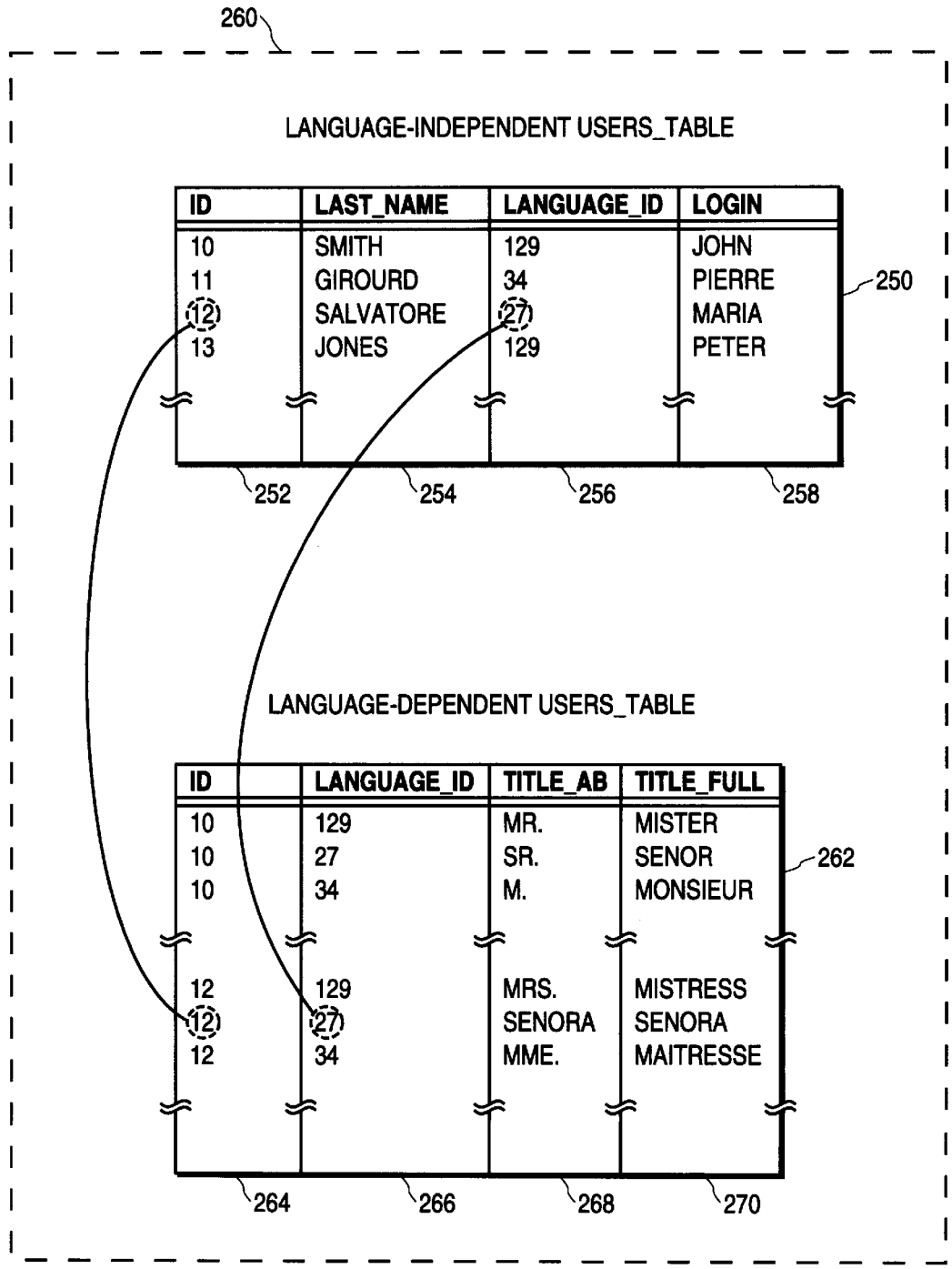
FIG. 23 is a diagrammatic representation of language-independent and language-dependent user tables, according to an exemplary embodiment of the present invention.

Utilizing the information contained in the TABLE_COLUMNS object 58, the build logic 42, and specifically the context-dependent build engine 41 included therein, constructs the composite HARDWARE_ITEMS table 223 to include a language-independent parent table 240 and a language-dependent child table 242. As illustrated, the language-independent table 240 includes the PRODUCT_NUMBER column 238 and an identifier ID column 244. The language-dependent table 242, which is separate from the language-independent table 240, includes the DESCRIPTION column 232, the UNITS column 234, and the CLASS column 236. The language-dependent table 242 further includes two identifier columns, namely an ID column 246 and a LANGUAGE_ID column 248. The identifier entries within the ID column 246 correspond to the identifiers included in the ID column 244 of the table 240, and function as links (or keys) between the tables 240 and 242. Each record within the language-independent table 240 may be linked or keyed to a number of records within the language-dependent table 242 by the identifiers included within the respective ID columns 244 and 246. Each identifier within the LANGUAGE_ID column 248 identifies the language of corresponding entries of the relevant record within the DESCRIPTION, UNITS and CLASS columns 232, 234 and 236. For example, the identifier "129" identifies the corresponding entries of the relevant record as being in the English language, whereas the identifier "27" identifies the corresponding entries of the record as being in the Spanish language. Entries within the ID and LANGUAGE_ID columns 246 and 248 of a record together constitute a unique key for that record within the language dependent table 242. As will be described in further detail below, in order for the context-dependent view engine 35 to construct a view that is appropriate for a predetermined context, both the record identifier within the ID column 242 and the language identifier within the LANGUAGE_ID column 248 must be specified. In the illustrated embodiment, the language identifier is shown to be specified by a context table in the form of a user table 250. Referring to FIG. 23, further details of an exemplary user table 250 are illustrated. The user table 250 is shown to include an ID column 252, a LAST_NAME column 254, a LANGUAGE_ID column 256 and a LOGIN column 258. Context identifiers in the form of language identifiers are included within the LANGUAGE_ID column 256. When constructing a view of database information, the context-dependent view engine 35 may, merely for example, identify a user that will be viewing the information, and using the language identifier together with a record identifier, be able to identify and retrieve a language-appropriate record from the language-dependent HARDWARE_ITEMS table 242. The context-dependent view engine 35 utilizes the TABLE_COLUMNS object 58, in the metadata, to identify a column of information to be retrieved as being language-dependent. The language-independent USERS table 250 may in turn comprise a parent table within a composite table 260, as illustrated in FIG. 23. A language-dependent USERS table 260 is shown to include language-dependent columns of the composite USERS table 260 and includes ID column 264, a LANGUAGE_ID column 266, a TITLE_AB column 268 including a language-appropriate title abbreviation, and a TITLE_FULL column 270 including a language-appropriate field title.

Referring again to FIG. 22, while the illustrated embodiment shows a single language-dependent table 242 as being dependent upon the language-independent table 240, the language-dependent information may be contained within a number of child tables, such as language-dependent tables 272 and 274 shown in broken lines.

FIG. 24 shows a LANGUAGE_CODE table 280 and a LANGUAGE_NAME table 282 that may be utilized in conjunction with the tables illustrated in FIGS. 22 and 23 to provide a user with information regarding language options, in a language of the user's preference. Specifically, the LANGUAGE_CODE table 280 includes an ID column 284 and a LANG_CODE column 286, including internationally recognized two letter codes for various languages. The LANGUAGE_NAME table 282 includes an ID column 288, a LANG_ID column 290 and a LANG_NAME column 292 including the names of each supported language, as reflected in each of the supported languages. For example, in a system supporting 137 languages, the name for each of those 137 languages will be specified in each of the relevant 137 languages.

METHODOLOGIES

Methods of constructing a context-dependent database, and of utilizing the constructed database to generate a context-dependent view, according to the teachings of the present invention, are described below with reference to FIGS. 25–27.

Figure 25:
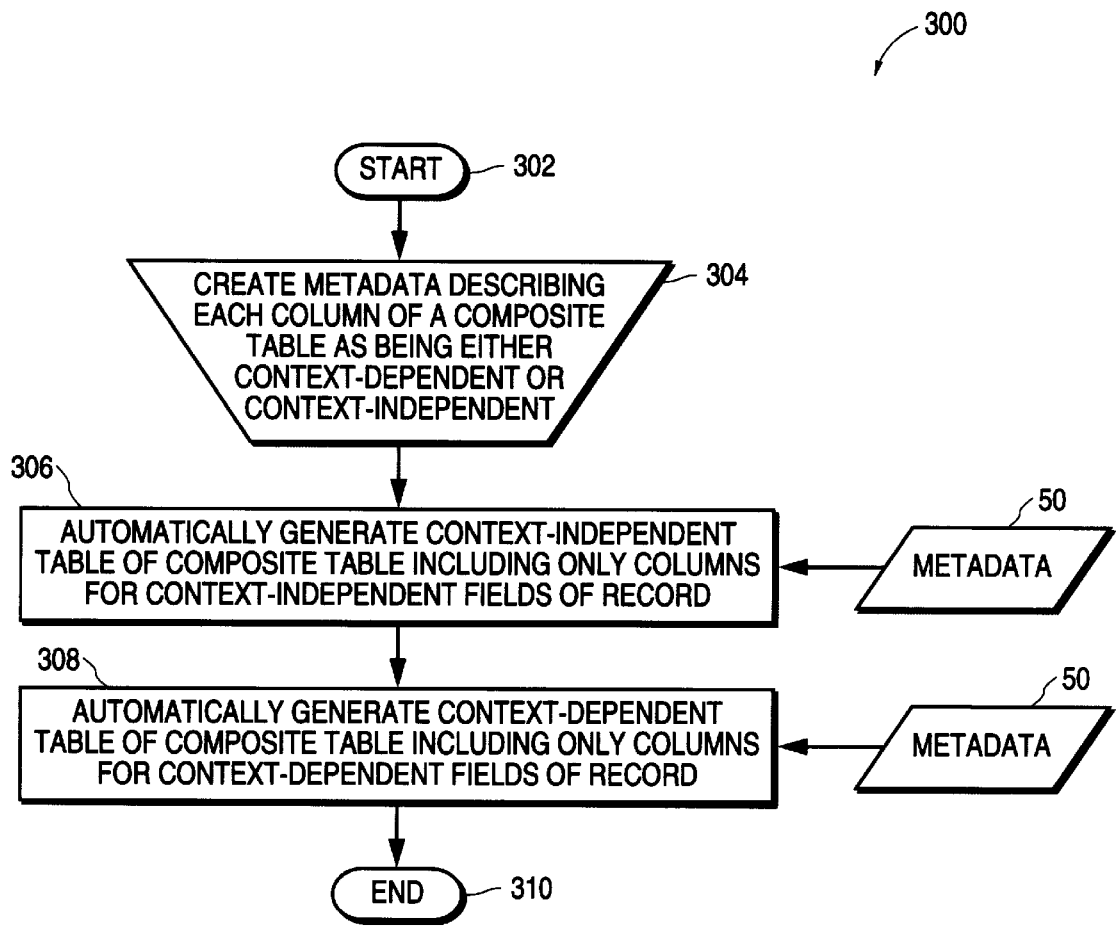
FIG. 25 is a flow chart illustrating a method, according to one embodiment of the present invention, of constructing a context-dependent database.

Referring to FIG. 25, there is illustrated a flow chart illustrating a method 300, according to one embodiment of the present invention, of constructing a context-dependent database. The method 300 commences at step 302, and proceeds to a manual operation 304, wherein metadata describing each column of a composite table is created. Inter alia, the metadata describes a number of columns as being either context-dependent or context-independent. It will be appreciated that these columns correspond to the fields of a specific record, and accordingly the description of a column as being either context-dependent or context-independent constitutes describing a corresponding field of a record as being context-dependent or context-independent. The method 300 then proceeds to a process step 306, where the context-dependent build engine 41 included within the build logic 40 automatically generates a parent, context-independent table including only columns for context-independent fields of a record. As stated above, the context-independent table may nonetheless include so-called "neutral" columns such as an identifier (ID) column, which may or may not be specified within the metadata. The automatic generation of the context-independent table by the build engine 41 is performed by referencing the metadata database 50 which identifies various columns as being either context-dependent or context-independent. Moving on from the process step 306, the method 300 proceeds to a process step 308, where the build engine 41 automatically generates child, context-dependent tables including only columns for the context-dependent fields of the various records. Again, the build engine 41 utilizes the metadata database 50 to identify the context-dependent columns to be included in the context-dependent tables. Further, the generation of the context-dependent tables at the process step 308 may include the generation of both a record identifier column and a context identifier column into which respective records and context identifiers for each record are incorporated. For example, the context identifiers may comprise language identifiers specifying a language for the entries of the relevant record. Alternatively, the context identifier may be a geographical or a user identifier.

Figure 26:
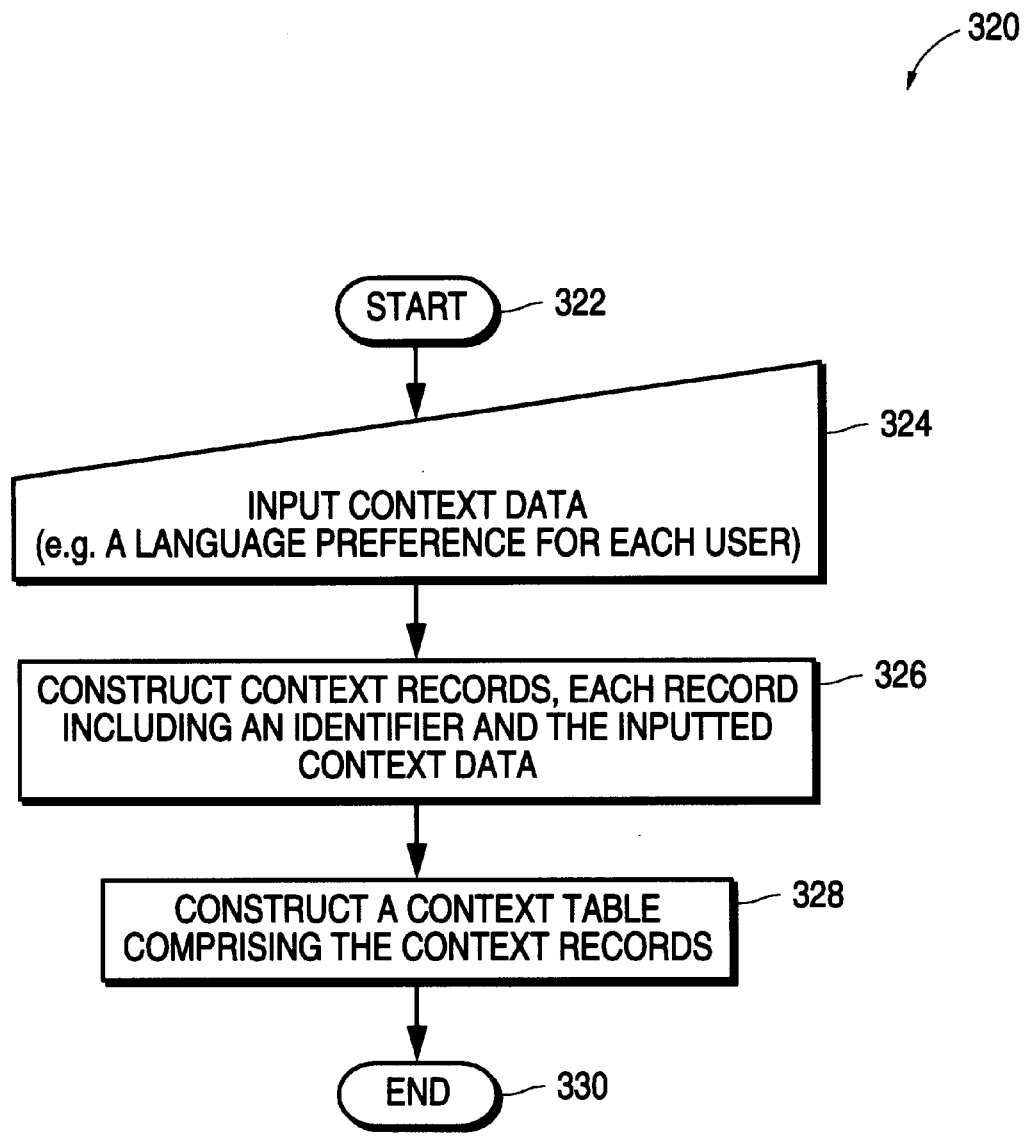
FIG. 26 is a flow chart illustrating a method, according to one embodiment of the present invention, of generating a context table.

FIG. 26 is a flow chart illustrating a method 320, according to an exemplary embodiment of the present invention, of generating a context table, such as the user table 50 illustrated in FIG. 23. The method commences at step 322, and proceeds to a manual input step 324, wherein context data is inputted. In one embodiment of the present invention, a user may be prompted to input a language preference, which is then utilized with other user information to construct a USERS table 250. At process step 326, context records are constructed, each record including an identifier and the inputted context data. Referring again to the USERS table 250 shown in FIG. 23, each record is constructed to include a record identifier, to be included in the ID column 252, and a language identifier to be included within the LANGUAGE_ID column 256.

At a process step 328, the context table is assembled from the various context records constructed at the process step 326, whereafter the method 320 terminates at step 330.

Figure 3:
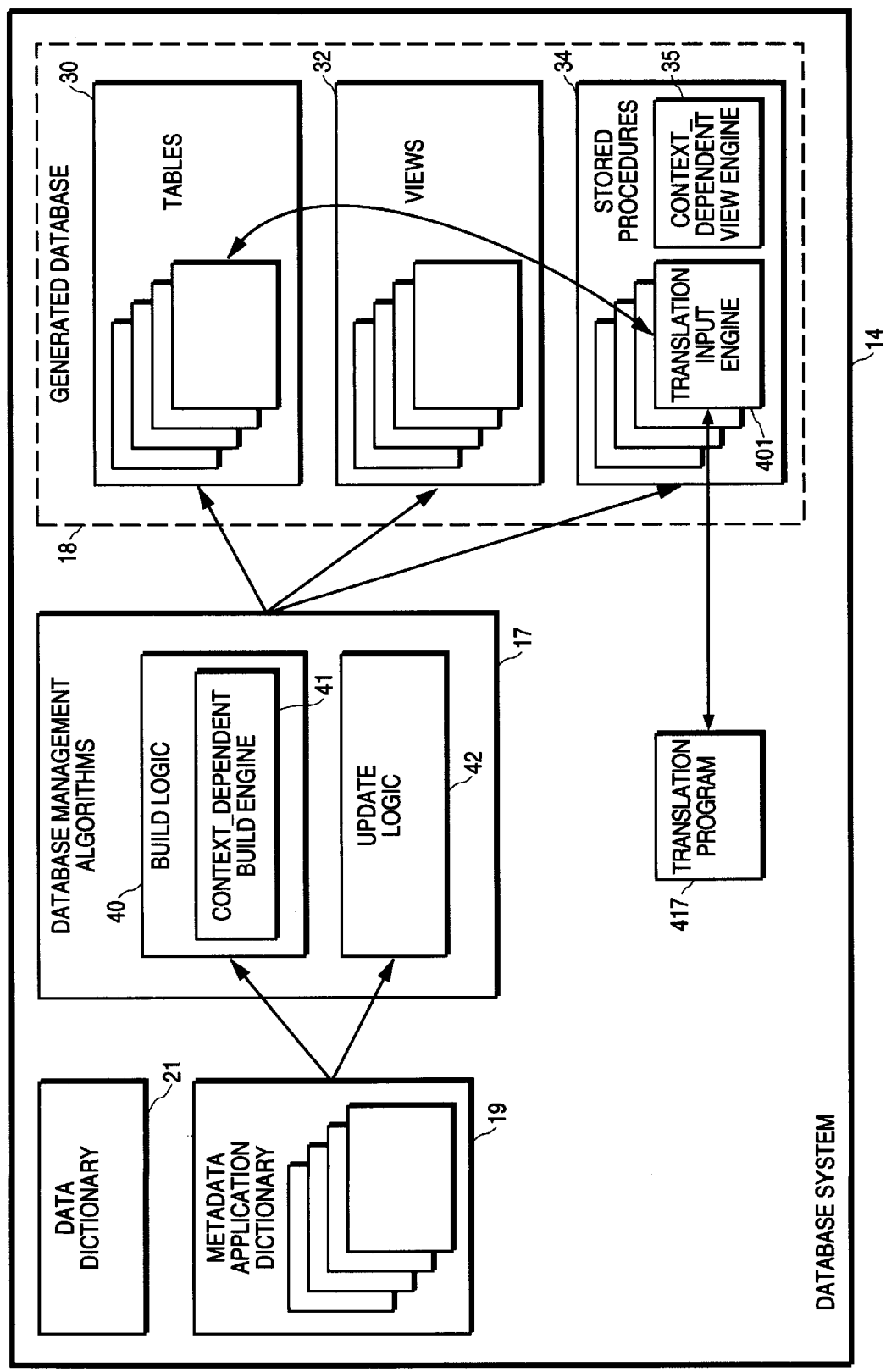
FIG. 3 is a block diagram illustrating an exemplary embodiment of a database system according to the present invention.

The manual input step 324 may be performed under the direction of a stored procedure object, such as those indicated in FIG. 3.

Figure 27:
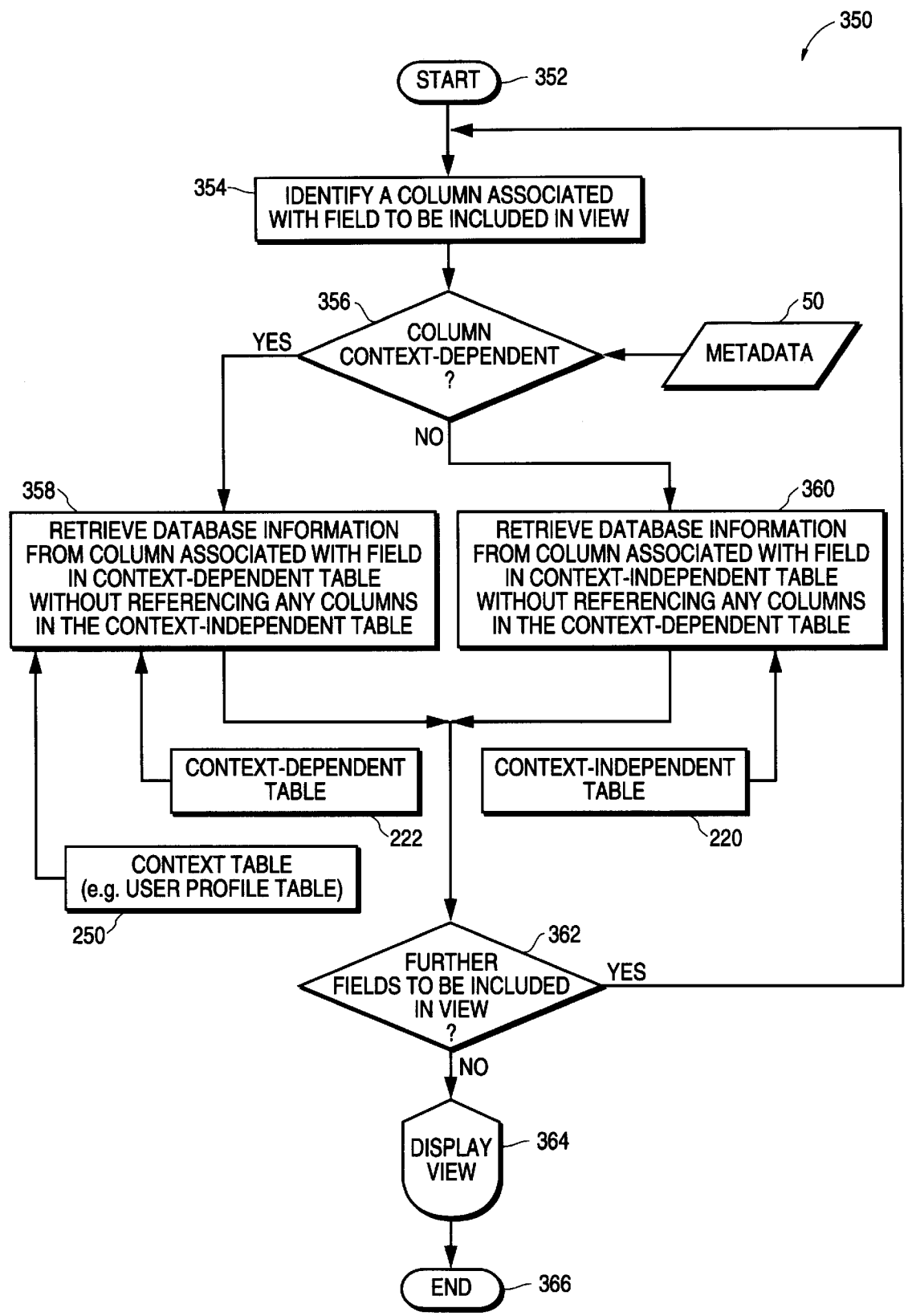
FIG. 27 is a flow chart illustrating a method, according to an exemplary embodiment of the present invention, of constructing a context-dependent view of database information.

FIG. 27 is a flow chart illustrating a method 350, according to one embodiment of the present invention, of constructing a context-dependent view of database information. The context-dependent view engine 35 shown in FIG. 3 may perform the method 350. The method 350 commences at step 352, whereafter the view engine 35 identifies a column (associated with a record field) to be included within a view at process step 354. Having identified a column, a determination is made at decision box 356 whether the column is context-dependent or context-independent. This determination is made by the view logic 35 with reference to the metadata database 50, which includes an appropriate indication to this end, as described above. Should it be determined that the column is in fact context-dependent, context-dependent database information is retrieved at process step 358. Specifically, the retrieval of the context-dependent information is made without referencing a context-independent column within the context-independent table. In one embodiment, a context-neutral column, such as an ID column may be referenced. As illustrated in FIG. 27, a context table 250, such as the user table 250 and a context-dependent table 222 provide input to this step. The present invention is advantageous in that the view engine 35, being aware of a record identifier and being aware of a context identifier, does not access the context-independent table at process step 358, and retrieves the context-dependent information directly from the context-dependent table. The absence of any "base" language against which a user-indicated language preference must be compared simplifies the data retrieval process performed at step 358. Accordingly, when generating a view, the present invention proposes that the view engine 35 be aware of a context identifier for all context-dependent information, and disposes with the requirement of having base information which is assumed as a default to be valid, unless in conflict with a context identifier.

On the other hand, should it be determined at decision box 356 that the column under consideration is context-independent, the method 350 proceeds to process step 360.

At step 360, database information is retrieved from a column within the context-independent table without referencing any column in the context-dependent table. Accordingly, a context-independent table 220 is shown as providing the only data input for the process step 360.

Having completed process step 358 or 360, the method 350 then proceeds to decision box 362, wherein a determination is made as to whether any further fields (or columns) are to be included in the view. This determination is made by referencing the metadata that describes the relevant view. If so, the method 350 moves back to process step 354. If not, the completed view is displayed at 364, and the method 350 terminates at step 366.

TRANSLATION MECHANISM

The inputting of context-dependent information into a relational database 60 should facilitate the various input and update situations that may arise. For example, a company supplying the database information may wish to seed a relational database 60 with basic information, which may or may not be context-dependent. Thereafter, the relational database 60 may need to be customized according to a customer's requirements, this setup procedure being performed by the customer itself, a consultancy or the company supplying the database software. It is advantageous to enable the customer itself, and specifically users of the database software, to perform the ongoing updating of the database. While prior art database systems typically allow customers to modify and input data within the database system, the ability to modify and input context-dependent data in the prior art is limited. Typically, the services of a database expert are required to modify any context-dependent information.

Figure 28:
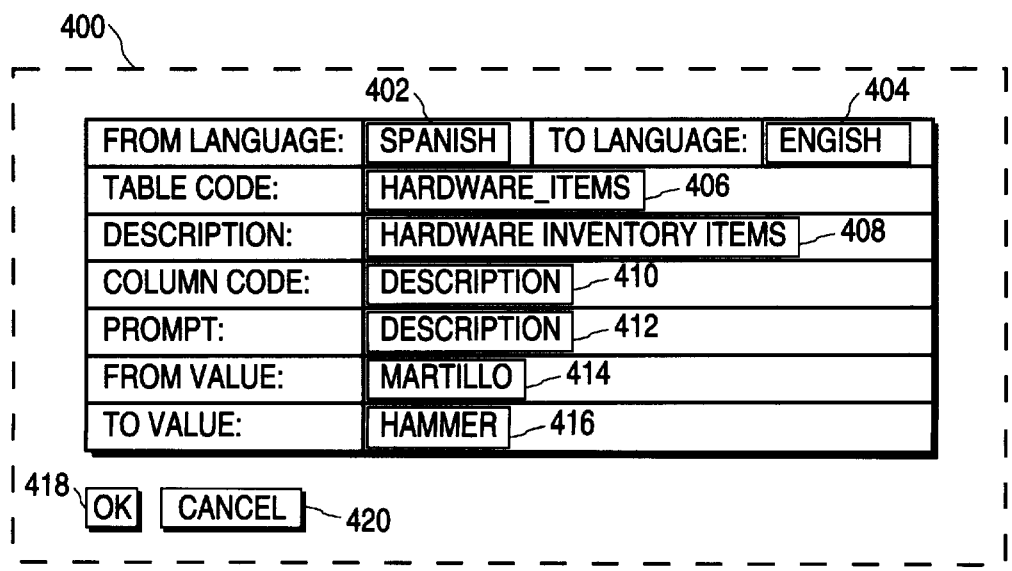
FIG. 28 shows a generic translation screen, according to one embodiment of the present invention, utilizing which a user may input translated values into the relational database.

In order to facilitate the input and updating of context-dependent information with equal ease by software programmers, database consultants and end users, the present invention proposes a generic translation screen (or interface), an exemplary embodiment of which is shown in FIG. 28. Specifically, a translation screen 400 includes a FROM LANGUAGE field 402, a TO LANGUAGE field 404, a TABLE CODE field 406, a DESCRIPTION field 408, a COLUMN CODE field 410, a PROMPT field 412, a FROM VALUE field 414 and a TO VALUE field 416.

In one embodiment of the present invention, the translation screen 400 is generated by a translation input engine 401 that, as shown in FIG. 3, is a shared procedure. The translation input engine 401, as will be described below, interacts with the tables 30 to input information into, and retrieve information from, these tables 30

When a user activates the translation screen 400, a user's preferred language is displayed in the TO LANGUAGE field 404. The user then selects input for the FROM LANGUAGE field 402. This selection may be made from a drop-down menu, a pop-up window or be imported from a pervious input screen.

Thereafter, a user selects a table and column to which the translation operation will apply. The selection is made by inputting appropriate information into the TABLE CODE field 406 and the COLUMN CODE field 410. In the illustrated example, a user has selected the HARDWARE__ITEMS composite table 222, shown in FIG. 22, as the relevant table, and has further selected the DESCRIPTION column 232 as the column to which the translation will be applied.

The next selection performed by the user is for the FROM VALUE field 414. A term for the FROM VALUE field 414 is selected from a list of terms presented to the user in the form of, merely for example, a drop-down menu. In the illustrated embodiment, the user would thus be presented with a list of all Spanish terms within the DESCRIPTION column 232 of the HARDWARE__ITEMS table 223. Having selected a term for the FROM VALUE field 414, a translation of the term in the language indicated in the TO LANGUAGE field 404 may be presented if such a translation exists. The user then has the option of modifying any presented term in the TO VALUE field 416. Alternatively, should no translation of the term indicated in the FROM VALUE field 414 exist, the user may then input an appropriate translation into the TO VALUE field 416. In one embodiment of the present invention, the translation input engine 401 may interact with translation program 417 that automates the translation of terms between multiple language. One example of such a translation program 417 is the Systran® Professional translation software developed by Systran Software, Inc. of Lajolla, Calif. The user is provided with a number of suggested translations of a term presented in the field 414 as a drop-down menu to the field 416. Having entered the contents of the field 416, a user then selects the OK button 418, which causes the translated value to be updated in the database.

COMPUTER SYSTEM

Figure 29:
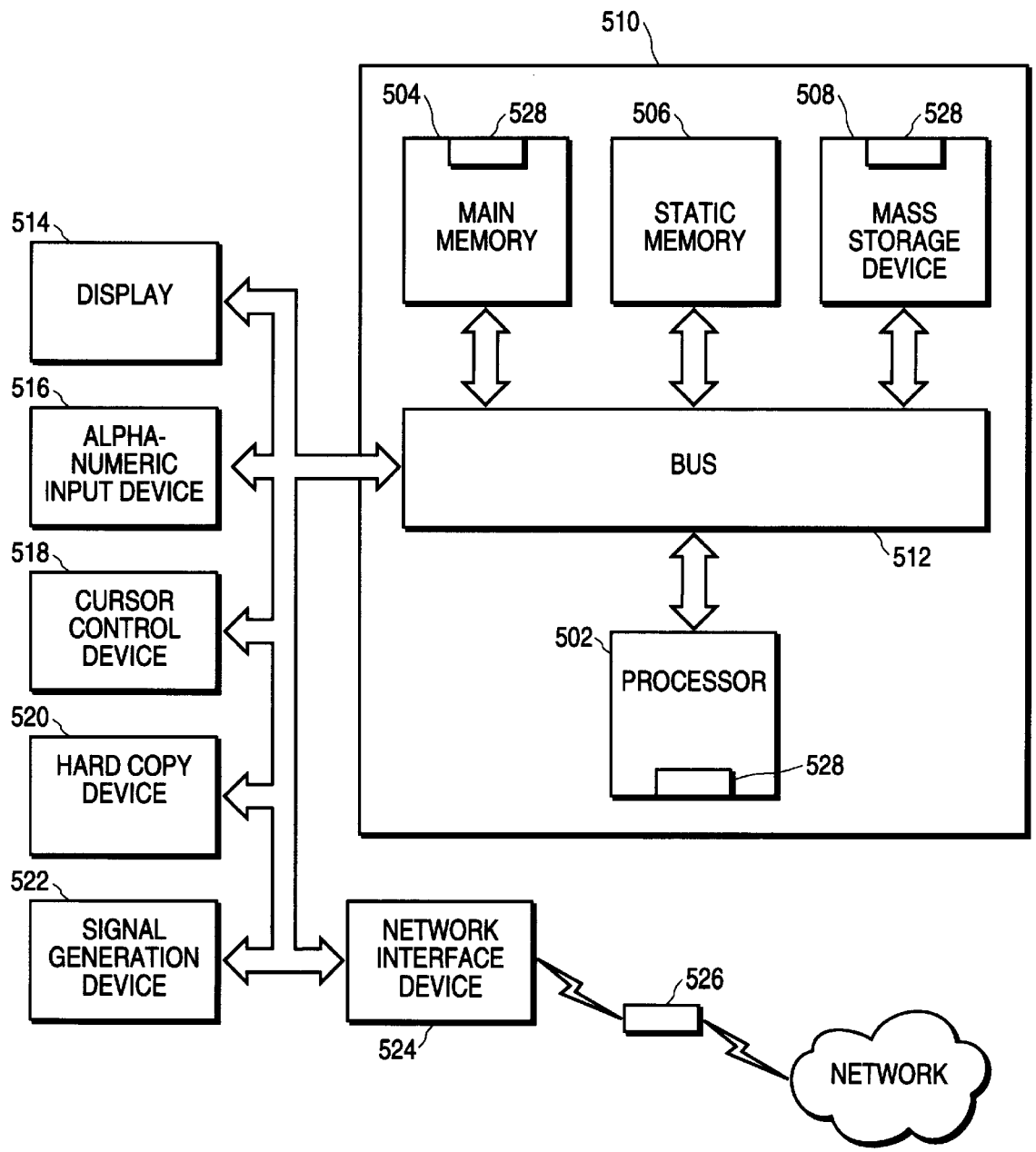
FIG. 29 is a diagrammatic representation of a computer system, according to one exemplary embodiment of the present invention, within which the methodologies of the present invention may be implemented and executed.

FIG. 29 is a diagrammatic representation of a computer system 500 which may host the server 12, or any of the clients 22, 26 or 30 shown in FIG. 2. The computer system 501 includes a processor 502, a main memory 504, a static memory 506 and a mass storage device 508, each of which is typically included within a housing 510, and coupled to a bus 512. External to the housing 510, and also coupled to the bus 512 are a display device 514, such as a Cathode Ray Tube (CRT) or an Liquid Crystal Display (LCD) unit; an alpha-numeric input device 516, such as a keyboard; a cursor control device 518, such as a mouse; a hard copy device 520, such as a printer; and a signal generation device 522, such as a microphone or speaker. The computer system 500 also includes a network interface device 524 which is also coupled to the bus 526. For the purposes of the specification, the term "computer-readable medium" shall be taken to include any media that may be utilized for the storage of a sequence of instructions for execution by the processor 502. In one embodiment of the present invention, the mass storage device 508 comprises a hard-disk drive unit, including a magnetic disk and the main memory 509 may be a Random Access Memory (RAM). The network interface device 524 may be coupled to a network (e.g., via an intranet or the Internet), and has the capability to transmit and receive signals via the network. Accordingly, for the purposes of the specification, the term "computer-readable medium" shall be taken to include, but not be limited to, a magnetic, electrical or optical storage medium or a signal transmitted or received by the network interface device 524. The present invention extends to any computer-readable medium storing a sequence of instructions which, when executed by the processor 502, cause the processor 502 to perform the steps illustrated in any one of the flow charts discussed above. A program 528 comprising such a sequence of instructions is shown to be resident, wholly or at least partially, in the main memory 504, the mass storage device 508 and the processor 502. The program 525 is also shown to be transmitted to (or from) the network interface device 524.

In summary, the present invention is advantageous in that it does not required the maintenance of language-dependent data in two places; one for the base language, and one for any other language. The present invention only stores language-dependent data in language-dependent tables, which simplifies both storage and retrieval logic. Further, the present invention may be viewed as a "denormalized" data storage approach, which is more consistent with efficient and safe data storage methodology. The present invention also has no requirement for language-dependent data to be translated to any one specific language. This may be a benefit to multilingual implementations of applications software. Thus, a multinational company based in the United States with sales offices in France and Germany could have a language-dependent product catalog available in French and German, and not necessarily in English.

Thus, a method of constructing a context-dependent database has been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method of constructing a context-dependent database, the method including the steps of:
    creating metadata to describe fields of a record as being either context-dependent or context-independent;
    generating a context-independent table excluding columns for the context-dependent fields of the record; and
    generating a context-dependent table, associated with the context-independent table, excluding columns for the context-independent fields of the record.

2. The method of claim 1 including the step of automatically generating the context-independent and context-dependent tables utilizing the metadata.

3. The method of claim 1 including the step of generating a record identifier for an entry of the context-independent table, and assigning the record identifier to multiple context-specific entries of the context-dependent table.

4. The method of claim 1 including the step of generating a context identifier for each entry in the context-dependent table, the context identifier identifying the entry as being appropriate for a specific context.

5. The method of claim 4 wherein the context identifier indicates a language preference.

6. The method of claim 4 wherein the context identifier indicates a geographical location.

7. The method of claim 4 wherein the context identifier indicates a user.

8. The method of claim 1 including the step of generating a context table including a context record describing a context and including a context identifier for use in associating an entry in the context-dependent table with the context record.

9. The method of claim 8 wherein the step of generating a context table comprises generating a user table including a record of user preferences.

10. The method of claim 1 including the step of generating a unique key for each entry of the context-dependent table, the unique key comprising a record identifier and a context identifier.

11. A method of constructing a context-dependent view of database information in a database including a context-dependent table and a context-independent table, the method including the steps of:
    identifying a field of a record to be retrieved as being either context-dependent or context-independent; and
    if the field is context-dependent, then retrieving database information for the field exclusively from a column associated with the field in a context-dependent table without reference to a column associated with a field in the context-independent table.

12. The method of claim 11 including the step of, if the field is context-independent, then retrieving the database information for the field exclusively from a context-independent table.

13. The method of claim 11 wherein the step of identifying comprises referencing a metadata description of a column associated with the field to determine whether the field is context-dependent or context-independent.

14. The method of claim 11 wherein the step of retrieving from the context-dependent table comprises locating an entry within the context-dependent table by referencing both a record identifier and a context identifier.

15. The method of claim 14 wherein the context identifier indicates a language preference.

16. The method of claim 14 wherein the context identifier indicates a geographical location.

17. The method of claim 14 wherein the context identifier indicates a user.

18. The method of claim 14 including the step of identifying the context identifier from a context table.

19. The method of claim 18 wherein the context table comprises a user table.

20. A method of constructing a multi-lingual database, the method including the steps of:
    defining metadata to describe a first field of record as being language-dependent and a second field of the record as being language-independent;
    automatically generating a first table, including a column for the first field of the record, but not having column for the second field; and
    automatically generating a second table, associated with the first table, including a column for the second field of the record, but not having a column for the first field.

21. A computer-readable medium having a sequence of instructions stored thereon that, when executed by a processor, cause the processor to construct a database by performing the steps of:
    examining metadata that describes fields of a record as being either context-dependent or context-independent;
    automatically generating a context-independent table excluding columns for the context-dependent fields of the record; and
    generating a context-dependent table, associated with the context-independent table, excluding columns for the context-independent fields of the record.

22. The computer-readable medium of claim 21 wherein the sequence of instructions cause the processor to perform the step of automatically generating the context-independent and context-dependent tables utilizing the metadata.

23. The computer-readable medium of claim 21 wherein the sequence of instructions cause the processor to perform the steps of generating a record identifier for an entry of the context-independent table, and of assigning the record identifier to multiple context-specific entries of the context-dependent table.

24. The computer-readable medium of claim 21 wherein the sequence of instructions cause the processor to perform the step of generating a context identifier for each entry in the context-dependent table, the context identifier identifying the entry as being appropriate for a specific context.

25. The computer-readable medium of claim 24 wherein the context identifier indicates a language preference.

26. The computer-readable medium of claim 24 wherein the context identifier indicates a geographical location.

27. The computer-readable medium of claim 24 wherein the context identifier indicates a user.

28. The computer-readable medium of claim 21 wherein the sequence of instructions cause the processor to perform the step of generating a context table including a context record describing a context and including a context identifier for use in associating an entry in the context dependent table with the context entry.

29. The computer-readable medium of claim 28 where in the sequence of instructions cause the processor to perform the step of generating a user table including a record of user preferences.

30. The computer-readable medium of claim 21 wherein the sequence of instructions cause the processor to perform the step of generating a unique key for each entry of the context-dependent table, the unique key comprising a record identifier and a context identifier.

31. A computer-readable medium having a sequence of instructions stored thereon that, when executed by a processor, cause the processor to construct a context-dependent view of database information by performing the steps of:

identifying a field of a record to be retrieved as being either context-dependent or context-independent; and if the field is context-dependent, then retrieving database information for the field exclusively from a column associated with the field in a context-dependent table without reference to a column associated with a field in the context-independent table.

32. The computer-readable medium of claim 31 wherein the sequence of instructions cause the processor to perform the step of, if the field is context-independent, retrieving the database information for the field directly and exclusively from a context-independent table.

33. The computer-readable medium of claim 31 wherein the sequence of instructions cause the processor to perform the step of referencing a metadata description of a column associated with the field to determine whether the field is context-dependent or context-independent.

34. The computer-readable medium of claim 31 wherein the sequence of instructions cause the processor to perform the step of locating an entry within the context-dependent table by referencing both a record identifier and a context identifier.

35. A method of constructing a context-dependent view of database information in a database including a context-dependent table and a context-independent table, the method including the steps of:

referencing a metadata description of a column, associated with a field of a record to be retrieved, to determine whether the field is context-dependent or context-independent; and if the field is context-dependent, then retrieving database information for the field exclusively from a column associated with the field in a context-dependent table without reference to a column associated with a field in the context-independent table.

* * * * *